(12) United States Patent
Lee et al.

(10) Patent No.: US 11,410,466 B2
(45) Date of Patent: Aug. 9, 2022

(54) ELECTRONIC DEVICE FOR PERFORMING BIOMETRIC AUTHENTICATION AND METHOD OF OPERATING THE SAME

(71) Applicant: SAMSUNG ELECTRONICS CO., LTD., Suwon-si (KR)

(72) Inventors: Jaeyong Lee, Suwon-si (KR); Daehee Park, Suwon-si (KR); Sanggon Song, Suwon-si (KR); Yenah Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/411,592

(22) Filed: May 14, 2019

(65) Prior Publication Data
US 2019/0347500 A1 Nov. 14, 2019

(30) Foreign Application Priority Data

May 14, 2018 (KR) .................. 10-2018-0054980
Oct. 29, 2018 (KR) .................. 10-2018-0130211

(51) Int. Cl.
*G06V 40/60* (2022.01)
*G06F 21/32* (2013.01)
(Continued)

(52) U.S. Cl.
CPC .............. *G06V 40/67* (2022.01); *G06F 21/32* (2013.01); *G06V 40/161* (2022.01); *G06V 40/172* (2022.01); *G06V 40/19* (2022.01); *G06V 40/197* (2022.01)

(58) Field of Classification Search
CPC ........... G06K 9/00912; G06K 9/00228; G06K 9/00288; G06K 9/00604; G06K 9/00617; G06F 21/32
See application file for complete search history.

(56) References Cited

U.S. PATENT DOCUMENTS

2014/0225978 A1  8/2014  Saban et al.
2016/0092720 A1  3/2016  Lee et al.
(Continued)

FOREIGN PATENT DOCUMENTS

JP  2017-208638  *  9/2017
JP  2017-208638     11/2017
(Continued)

OTHER PUBLICATIONS

International Search Report and Written Opinion dated Aug. 26, 2019, issued in International Application No. PCT/KR2019/005802.
(Continued)

*Primary Examiner* — Nizar N Sivji
*Assistant Examiner* — Umair Ahsan
(74) *Attorney, Agent, or Firm* — Nixon & Vanderhye P.C.

(57) ABSTRACT

According to an embodiment, an electronic device comprises a camera module including a camera, a sensor module including sensing circuitry, a display, a memory; and a processor configured to: control the memory to store registered biometric information, obtain at least one image using the camera module, obtain biometric information using the sensor module, control the display to display a first object generated by converting at least part of a second object included in the at least one image, and control the display to display the first object together with information for changing posture based on at least one of a position, shape, or size of a third object included in the at least one image until the obtained biometric information and the registered biometric information meet a designated condition.

28 Claims, 31 Drawing Sheets

(51) Int. Cl.
*G06V 40/19* (2022.01)
*G06V 40/16* (2022.01)
*G06V 40/18* (2022.01)

(56) References Cited

U.S. PATENT DOCUMENTS

2017/0255767 A1  9/2017 Ren
2017/0372056 A1  12/2017 Narasimhan
2018/0012070 A1* 1/2018 Shin .................. G06K 9/00597
2018/0033013 A1  2/2018 Park et al.
2018/0336715 A1* 11/2018 Rickwald ........... G06K 9/00315

FOREIGN PATENT DOCUMENTS

| | | |
|---|---|---|
| KR | 10-2012-0048813 | 5/2012 |
| KR | 10-2017-0031542 | 3/2017 |
| KR | 20170031542 A * | 3/2017 |
| KR | 10-2017-0117786 | 10/2017 |
| KR | 10-2018-0013173 | 2/2018 |
| WO | WO 2014-178044 | 11/2014 |

OTHER PUBLICATIONS

European Search Report dated Mar. 1, 2021 for EP Application No. 19803710.3.
Extended European Search Report dated May 20, 2021 for EP Application No. 19803710.3.
Park et al., "Mediated Reality Photography With CCTV-Assisted Objection Elimination Using Graph Cut" 2017 International Conference on Information and Communication Technology Convergence (ICTC), Oct. 18, 2017, pp. 168-171.

* cited by examiner

ELECTRONIC DEVICE FOR PERFORMING BIOMETRIC AUTHENTICATION AND METHOD OF OPERATING THE SAME

CROSS-REFERENCE TO RELATED APPLICATIONS

This application is based on and claims priority under 35 U.S.C. 119 to Korean Patent Application No. 10-2018-0054980, filed on May 14, 2018, in the Korean Intellectual Property Office, and Korean Patent Application No. 10-2018-0130211, filed on Oct. 29, 2018, in the Korean Intellectual Property Office, the disclosures of which are incorporated by reference herein in their entireties.

BACKGROUND

Technical Field

The present disclosure relates generally to electronic devices for performing biometric authentication and methods of operating the same.

Description of Related Art

Biometric authentication technology using portable electronic devices has recently increased in popularity. Smartphones or other electronic devices may perform authentication via various biometric authentication schemes, e.g., iris or face recognition. An electronic device may obtain biometric information via a biometric authentication sensor and perform authentication in such a manner as to determine whether the obtained biometric information matches information stored. Thus, the user needs to position the user's body part (e.g., eyes or face) to where the sensor is able to obtain biometric information.

The electronic device may display a guide line indicating the position of obtaining biometric information and an image captured by its front camera to allow the user to place the user's body part in the exact position for obtaining biometric information. The user may identify the user's captured image on the display and thus reposition the user's body part to where biometric information may be obtained.

A security issue may arise while the electronic device displays the captured image on the display for biometric authentication as mentioned above. For example, there may be a chance of leakage of biometric information, e.g., iris or face information, if the electronic device happens to have a hacking program installed thereon. Iris or face information which is unique to the user should be prevented from leakage but may possibly be leaked as the image captured of the body part is displayed on the display. Further, users would be reluctant to allow their particular body part to be exposed in a public place.

The above information is presented as background information only to assist with an understanding of the disclosure. No determination has been made, and no assertion is made, as to whether any of the above might be applicable as prior art with regard to the disclosure.

SUMMARY

According to various example embodiments, an electronic device capable of converting an image captured of the user into an object and displaying the object and a method of operating the same may be provided.

According to an example embodiment, an electronic device comprises a camera module including a camera, a sensor module including sensing circuitry, a display, a memory; and a processor configured to: control the memory to store registered biometric information, obtain at least one image using the camera module, obtain biometric information using the sensor module, control the display to display a first object generated by converting at least part of a second object included in the at least one image, and control the display to display the first object together (as used herein, the term together may refer, for example, and without limitation, being on the same screen and/or at the same time) with information for changing posture based on at least one of a position, shape, or size of a third object included in the at least one image until the obtained biometric information and the registered biometric information meet a designated condition.

According to an example embodiment, a method of operating an electronic device including a camera module, a sensor module, and a display comprises obtaining at least one image using the camera module, obtaining biometric information using the sensor module, displaying, via the display, a first object generated by converting at least part of a second object included in the at least one image, and displaying, via the display, the first object together with information for changing posture based on at least one of a position, shape, or size of a third object included in the at least one image until the obtained biometric information and registered biometric information meet a designated condition.

According to an example embodiment, an electronic device comprises a camera module including a camera, a sensor module including sensing circuitry, a display, a memory, and a processor configured to: control the memory to store registered biometric information, obtain at least one image using the camera module, obtain biometric information using the sensor module, control the display to display a first object generated by converting at least part of a second object included in the at least one image, control the display to display the first object together with a guide indicating a region for obtaining the biometric information, and identify that authentication succeeds based on identifying that the obtained biometric information and the registered biometric information meet a designated condition.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and attendant advantages of the present disclosure will be more apparent and readily appreciated from the following detailed description, taken in conjunction with the accompanying drawings, wherein.

Throughout the drawings, like reference numerals will be understood to refer to like parts, components, and structures.

DETAILED DESCRIPTION

The electronic device according to various example embodiments may be one of various types of electronic devices. It should be appreciated that various example embodiments of the disclosure and the terms used therein are not intended to limit the techniques set forth herein to particular embodiments and that various changes, equivalents, and/or replacements thereof also fall within the scope of the disclosure. The same or similar reference denotations may be used to refer to the same or similar elements throughout the disclosure and the drawings.

It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items.

As used herein, the terms "1st" or "first" and "2nd" or "second" may be used to refer to corresponding components regardless of importance and/or order and may be used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" may include a unit configured in hardware, software, firmware, or any combinations thereof, and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Figure 1:
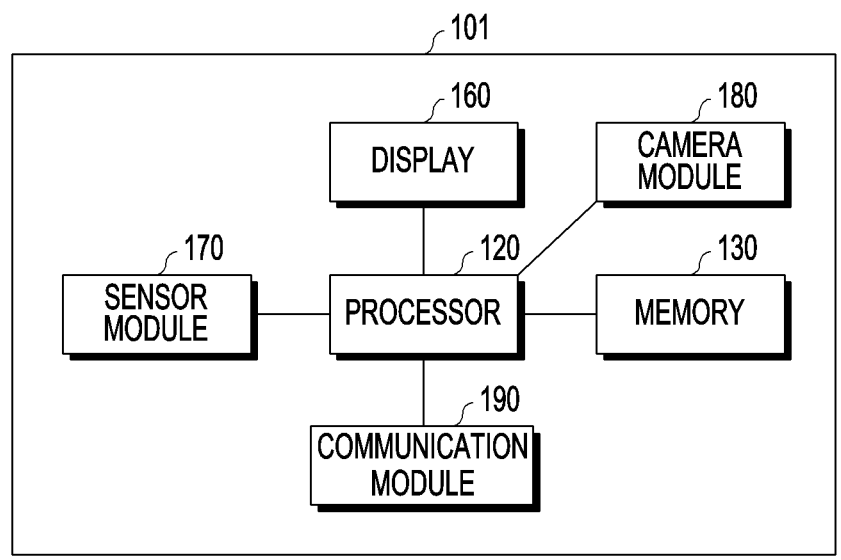
FIG. 1 is a block diagram illustrating an example electronic device according to an embodiment.

FIG. 1 is a block diagram illustrating an example electronic device according to an embodiment of the disclosure.

Referring to FIG. 1, according to an embodiment, an electronic device 101 may include at least one of a processor (e.g., including processing circuitry) 120, a memory 130, a display 160, a sensor module (e.g., including at least one sensor and/or sensing circuitry) 170, a camera module (e.g., including a camera) 180, and/or a communication module (e.g., including communication circuitry) 190.

The processor 120 may include various processing circuitry and execute, for example, software (e.g., a program) to control at least one other component (e.g., a hardware or software component) of the electronic device 101 coupled with the processor 120, and may perform various data processing or computations. According to an example embodiment, as at least part of the data processing or computation, the processor 120 may load a command or data received from another component (e.g., the sensor module 170 or communication module 170 or a sensor module 190) onto a volatile memory, process the command or the data stored in the volatile memory, and store resulting data in a non-volatile memory. According to an embodiment, the processor 120 may include various processing circuitry, including, for example, a main processor (e.g., a central processing unit (CPU), an application processor (AP), or the like), and an auxiliary processor (e.g., a graphics processing unit (GPU), an image signal processor (ISP), a sensor hub processor, a communication processor (CP), or the like) that is operable independently from, or in conjunction with, the main processor. The auxiliary processor may be adapted to consume less power than the main processor, or to perform a specified function. The auxiliary processor may be implemented as separate from, or as part of the main processor. However, the processor is not limited to the foregoing examples.

The memory 130 may store various data used by at least one component (e.g., the processor 120 or the sensor module 170) of the electronic device 101. The various data may include, for example, and without limitation, software (e.g., the program), input data, output data, or the like, for a command related thereto. The memory 130 may include, for example, a volatile memory, a non-volatile memory, or the like.

According to an embodiment, the memory 130 may store commands (or a program or application) to perform a biometric authentication process. The memory 130 may store security information (e.g., iris information or face information) for biometric authentication. For example, the user may perform an operation for registering biometric information which is to be used later for biometric authentication. The electronic device 101 may provide a user interface to obtain biometric information and obtain initial biometric information through the sensor module 170. The electronic device 101 may store biometric information (or encoded biometric information) in the memory 130. The stored biometric information may be later compared with biometric information obtained via the sensor module 170. The memory 130 may include conversion information (or conversion model) capable of converting captured images. For example, the memory 130 may store, e.g., a program capable of extracting various objects or feature points from a captured image, a recognition program, and visual elements that may replace recognized objects.

The processor 120 may control the display 160 of the electronic device 101 to display image-converted objects (e.g., emojis or characters) on the display 160 using information stored in the memory 130 and images obtained via the camera module 180.

The display 160 may visually provide information to the outside (e.g., a user) of the electronic device 101. The display 160 may include, for example, and without limitation, a liquid crystal display (LCD) panel, a hologram device, a projector, or the like, and control circuitry to control a corresponding one of the display, hologram device, projector, or the like. According to an embodiment, the display 160 may include touch circuitry adapted to detect a touch, or sensor circuitry (e.g., a pressure sensor) adapted to measure the intensity of force incurred by the touch. The display 160 may display an object obtained by converting at least one object included in at least one image obtained via the camera module 180. The display 160 may display information (e.g., a text, image, or animation) to lead the user's body part, which is a target for authentication, to a designated position.

The sensor module 170 may include various sensing circuitry and/or sensors and obtain biometric information. For example, the sensor module 170 may include an infrared (IR) emitter and an IR receiver. The IR emitter may include various circuitry to radiate IR rays to the outside. The IR receiver may include various circuitry to receive IR rays reflected by an object positioned outside.

For example, when the electronic device 101 adopts iris recognition, the electronic device 101 may radiate an IR ray via the IR emitter and receive the IR ray reflected by the user's body part, e.g., eyes, via the IR receiver. Thus, the electronic device 101 may obtain an IR image for the user's eye. For example, when the electronic device 101 adopts face recognition, the electronic device 101 may radiate an IR ray via the IR emitter and receive the IR ray reflected by the user's body part, e.g., face, via the IR receiver. Thus, the electronic device 101 may obtain an IR image for the user's face.

The camera module 180 may include a camera and capture a still image and/or moving images. According to an embodiment, the camera module 180 may include, for example, and without limitation, one or more lenses, image sensors, image signal processors, flashes, or the like. The camera module 180 may be disposed on a surface including an opening through which the display 160 is exposed among a plurality of surfaces of the housing of the electronic device 101. Thus, the camera module 180 may capture the user who is staring at the display 160.

The communication module 190 may include various communication circuitry and establish a direct (e.g., wired) communication channel and/or a wireless communication channel between the electronic device 101 and an external electronic device or support communication through the established communication channel. The communication module 190 may include one or more communication processors that are operable independently from the processor 120 (e.g., the application processor (AP)) and may support a direct (e.g., wired) communication and/or a wireless communication. According to an embodiment, the communication module 190 may include various modules, each including various communication circuitry, such as, for example, and without limitation, a wireless communication module (e.g., a cellular communication module, a short-range wireless communication module, a global navigation satellite system (GNSS) communication module, or the like), a wired communication module (e.g., a local area network (LAN) communication module, a power line communication (PLC) module, or the like), or the like. Corresponding communication modules may communicate with the external electronic device via the first network (e.g., a short-range communication network, such as Bluetooth, wireless-fidelity (Wi-Fi) direct, infrared data association (IrDA), or the like), a second network (e.g., a long-range communication network, such as a cellular network, the Internet, a computer network (e.g., LAN or wide area network (WAN)), or the like). These various types of communication modules may be implemented as a single component (e.g., a single chip), or may be implemented as multi components (e.g., multi chips) separate from each other. The wireless communication module may identify and authenticate the electronic device 101 in a communication network, such as the first network or the second network, using subscriber information (e.g., international mobile subscriber identity (IMSI)) stored in the subscriber identification module. The communication module 190 may receive registered biometric information from an external electronic device. The communication module 190 may receive information about a conversion object (e.g., information about registered emoji) from the external electronic device. Upon identifying biometric authentication success, the communication module 190 may transmit information indicating authentication success to the external electronic device. The communication module 190 may transmit biometric information or encrypted biometric information to the external electronic device.

According to an example embodiment, the processor 120 may be configured to control the electronic device to obtain at least one image using the camera module 180, obtain biometric information via the sensor module 170, display, via the display 160, a conversion object generated by converting at least part of an object included in the at least one image based on the at least one image, and display, via the display 160, the conversion object along with (e.g., together with) information for changing posture identified based on at least one of a position, shape, or size of a target object for recognition included in the at least one image until the obtained biometric information and the registered biometric information meet a designated condition. In the disclosure, the terms "along with" and "together with" may be used interchangeably and may refer, for example, and without limitation, to being displayed on the same screen and/or at the same time.

According to an example embodiment, the processor 120 may be configured to control the sensor module to radiate an infrared (IR) ray and receive a reflection of the IR ray, identify an IR image for a user's eye based on the IR reflection, identify iris information from the IR image, and display, on the display 160, the information for changing posture until the identified iris information corresponds to iris information stored in the memory 130.

According to an example embodiment, the processor 120 may be configured to control the sensor module 170 to radiate an infrared (IR) ray and receive a reflection of the IR ray, identify an IR image for a user's face based on the IR reflection, identify face information from the IR image, and display, on the display, the information for changing posture until the identified face information corresponds to face information stored in the memory.

According to an example embodiment, the processor 120 may be configured to display, via the display 160, the information for changing posture identified based on at least one of a difference between the position of the target object for recognition and a designated reference position, a difference between the shape of the target object for recognition and a designated reference shape, or a difference between the size of the target object for recognition and a designated reference size.

According to an example embodiment, the processor 120 may be configured to display, via the display 160, at least one of a text, an image, or an animation set corresponding to at least one of the difference between the position of the target object for recognition and the designated reference position, the difference between the shape of the target object for recognition and the designated reference shape, or the difference between the size of the target object for recognition and the designated reference size.

According to an example embodiment, the processor 120 may be configured to control the display to display the conversion object along with a guide based on at least one of the designated reference shape or the designated reference size in a position corresponding to the designated reference position.

According to an example embodiment, the processor 120 may be configured to determine at least one of a position, size, or shape of the conversion object based on at least one of the position, size, or shape of the target object for recognition included in the at least one image.

According to an example embodiment, the processor 120 may be configured to generate the conversion object using a texture corresponding to at least one object included in the at least one image or generate the conversion object using a texture stored in the memory 130.

According to an example embodiment, the processor 120 may be configured to, upon identifying that a first target object for recognition included in a first image of the at least one image meets a first condition, display, via the display 160, first information for changing posture along with a first conversion object obtained by converting at least part of an object included in the first image and, upon identifying that a second target object for recognition included in a second image obtained after the first image meets a second condition, display, via the display 160, second information for changing posture, the second information being different from the first information for changing posture, together with a second conversion object obtained by converting at least part of an object included in the second image.

According to an example embodiment, the processor 120 may be configured to control the electronic device to obtain at least one image using the camera module 180, to control the electronic device to obtain biometric information via the sensor module 170, display, via the display 160, a conversion object generated by converting at least part of an object included in the at least one image based on the at least one image, display, on the display 160, the conversion object together with a guide indicating a region for obtaining the biometric information, and upon identifying that the obtained biometric information and the registered biometric information meet a designated condition, identify that authentication succeeds.

According to an example embodiment, the processor 120 may be configured to determine at least one of a position, size, or shape of the conversion object based on at least one of the position, size, or shape of the target object for recognition included in the at least one image.

According to an example embodiment, the processor 120 may be configured to identify the presence of an object disturbing detection of the target object for recognition based on a result of analyzing the at least one image and provide the conversion object along with information requesting to change a position of the object disturbing detection of the target object for recognition.

According to an example embodiment, the processor 120 may be configured to identify a contaminant on the sensor module 170 and provide the conversion object along with information requesting to remove the contaminant.

According to an example embodiment, the processor 120 may be configured to identify an authentication failure based on the obtained biometric information and the registered biometric information not meeting the designated condition within a preset time and display, via the display 160, an emoji corresponding to the authentication failure.

According to an example embodiment, the memory 130 may store a template image. The processor 120 may be configured to identify a size of the template image based on at least one of the position, shape, or size of the target object for recognition included in the at least one image and display the template image of the identified size as the conversion object.

According to an example embodiment, the memory 130 may store a template image. The processor 120 may be configured to adjust at least one of a position, shape, or size of a sub object in the template image based on at least one of the position, shape, or size of the target object for recognition included in the at least one image and display the adjusted template image as the conversion object.

According to an example embodiment, the memory 130 may store information about a designated action. The processor 120 may be configured to identify information about a user's action based on the at least one image and, based on the obtained biometric information and the registered biometric information meeting the designated condition and the identified information about the user's action corresponding to the information about the designated action, determine that authentication succeeds.

According to an example embodiment, the memory 130 may store information about a designated action. The processor 120 may be configured to identify information about a user's action based on data from the sensor module 170 and, based on the obtained biometric information and the registered biometric information meeting the designated condition and the identified information about the user's action corresponding to the information about the designated action, determine that authentication succeeds.

Figure 2:
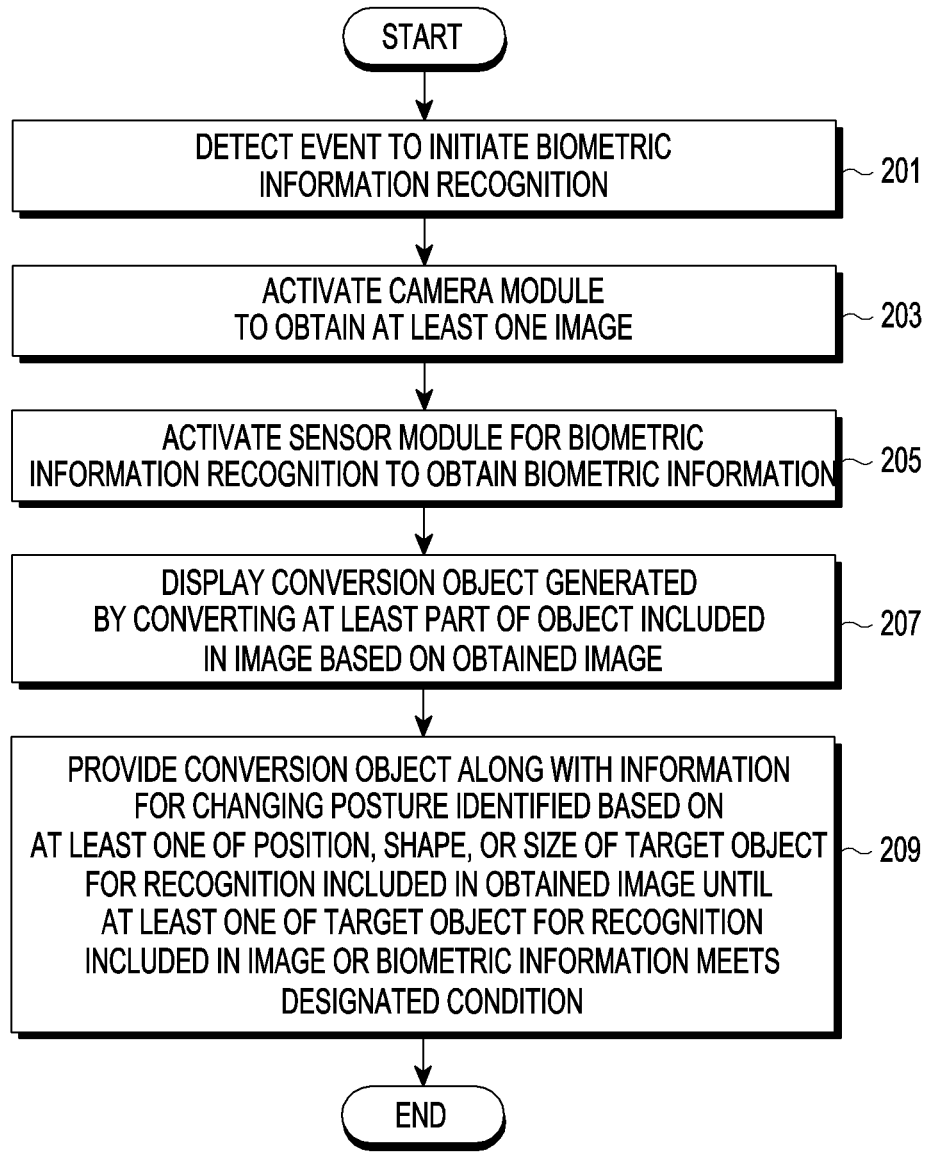
FIG. 2 is a flowchart illustrating an example method of operating an electronic device according to an embodiment.

FIG. 2 is a flowchart illustrating an example method of operating an electronic device according to an embodiment.

According to an embodiment, the electronic device 101 may detect an event to initiate biometric information recognition in operation 201. For example, the electronic device 101 may enter a sleep state (or a doze state) at the user's request or when no user interaction is detected for a predetermined time. Thereafter, the electronic device 101 may detect an occurrence of an event for entry into a wake-up state. In this case, the electronic device 101 may be configured to display the screen which used to be displayed before entry into the sleep state, or a menu screen after user authentication is successfully performed. The electronic device 101 may detect the occurrence of an event for entry into the wake-up state as an event to initiate biometric information recognition. According to an embodiment, the electronic device 101 may obtain an event to initiate biometric information recognition from an application while running a security-related application (e.g., a financial application, electronic payment application, or a web browser application running a login-required website). The event to initiate biometric information recognition may be detected before a security-required operation of the electronic device 101 is performed.

As used herein, "electronic device 101 performs a particular process" may refer, for example, to a situation in which the processor 120 of the electronic device 101 performs the particular process or controls other hardware component(s) to perform the particular process. "Electronic device 101 performs a particular process" may refer, for example, to a situation in which a particular hardware component performs the particular process without being controlled by the processor 120. "Electronic device 101 performs a particular process" may refer, for example, to a situation in which, as at least one command stored in the memory 130 of the electronic device 101 is executed, the processor 120 performs the particular process or controls other hardware component(s) to perform the particular process.

In operation 203, the electronic device 101 may activate the camera module 180 to obtain at least one image. In operation 205, the electronic device 101 may activate the sensor module 170 for recognizing biometric information and obtain biometric information. According to an embodiment, the electronic device 101 may, for example, simultaneously perform the obtaining of at least one image via the camera module 180 and the obtaining of biometric information via the sensor module 170.

In operation 207, the electronic device 101 may display, on the display 160, a conversion object which is generated by converting at least part of an object contained in the image based on the obtained image. The electronic device 101 may display, on the display 160, a conversion object which is generated by converting at least part of an object contained in the image based on various conversion schemes. For example, the electronic device 101 may obtain an emoji which results from converting the face region included in the obtained image and display the emoji. For example, the electronic device 101 may extract the face region included in the obtained image in which case various face detection schemes (e.g., neural network, adaboost, support vector machine scheme, or the like, without limitation) may be used. The electronic device 101 may lay a face image texture (e.g., an eye texture, nose texture, mouth texture, or the like) of a captured 2D image on a prepared 3D template. In this example, the eye texture, nose texture, mouth texture, etc. may be a texture graphically processed to allow the eye region, nose region, or mouth region in the obtained image to be represented as a drawing (or animation object). The eye texture may not include iris information. The electronic device 101 may also use prepared texture information on other regions (e.g., ears, hair, back of the head). The electronic device 101 may modify the texture-formed 3D template based on the user's interaction, thereby generating a 3D emoji. As set forth above, the eye texture included in the 3D emoji might not contain iris information. The electronic device 101 may generate an emoji or character mimicking the user from an image in various manners. It will readily be appreciated by one of ordinary skill in the art that generating emojis or characters is not limited to a particular method or the methods disclosed above. As another example, the electronic device 101 may replace it with any visual element representing the body part based on the position of at least one object (e.g., an eye object) from the obtained image and display it. In this case, the conversion object may be represented in a prepared shape, but not in a shape mimicking the user. Even in this case, since the properties (e.g., at least one of the position, size, or shape) are determined using the properties (e.g., at least one of the position, size, or shape) of the object in the image, the visual element may also be named a conversion object.

In operation 209, the electronic device 101 may provide the conversion object along with information for changing posture, which is identified based on at least one of the position, shape, or size of the target object for recognition included in the obtained image until at least one of the biometric information or the target object for recognition included in the image meets a designated condition. According to an embodiment, the electronic device 101 may provide information for changing posture until the obtained biometric information and the pre-registered biometric information meet a designated condition. For example, the electronic device 101 may provide the conversion object along with information for changing posture, which is identified based on at least one of the position, shape, or size of the target object for recognition included in the obtained image until a difference between the obtained biometric information and the pre-registered biometric information is at a threshold or less. In other words, the electronic device 101 may provide the information for changing posture until authentication succeeds. The electronic device 101 may provide the identified information for changing posture based on a difference between at least one of the position, shape, or size of the target object for recognition included in the obtained image and at least one of a designated position, designated shape, or designated size of the target object for recognition in the image. For example, when the position of an eye in the image is identified to be below a predesignated position, the electronic device 101 may provide at least one of a text, image, or animation to allow the user to tilt the user's head up a little bit. For example, when the size of an eye in the image is identified to be smaller than a predesignated size, the electronic device 101 may provide at least one of a text, image, or animation to allow the user to turn the user's face to the camera module 180. For example, when the shape of an eye in the image is identified to have a difference from a predesignated shape, the electronic device 101 may provide at least one of a text, image, or animation to allow the user to adjust the direction in which the user's face is oriented.

According to an embodiment, the electronic device 101 may provide the identified information for changing posture based on a difference between at least one of the position, shape, or size of the target object for recognition included in the obtained image and at least one of a designated position, designated shape, or designated size of the target object for recognition in the image until at least one of target objects for recognition included in the image meets a designated condition.

Figure 3A:
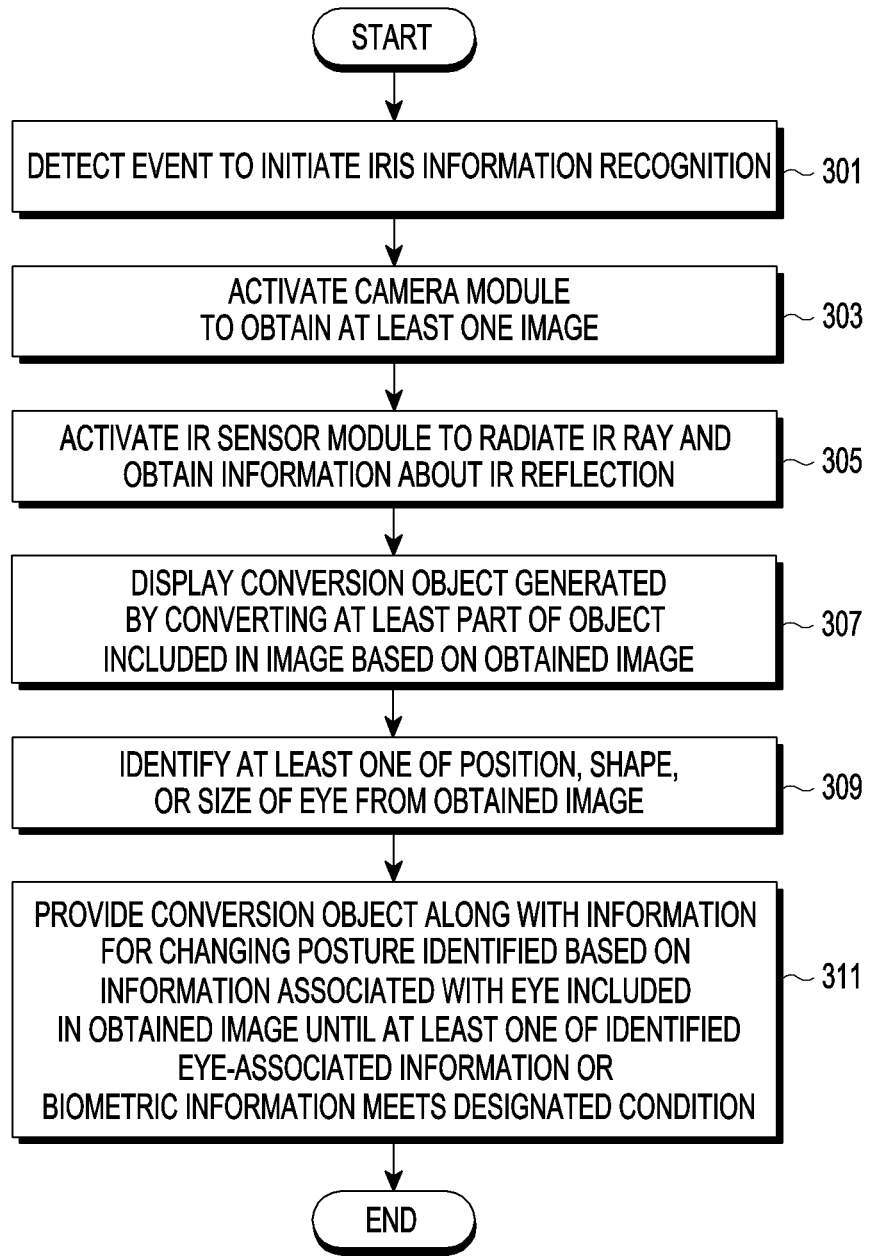
FIGS. 3A and 3B are flowcharts illustrating an example method of operating an electronic device according to an embodiment.
Figure 3B:
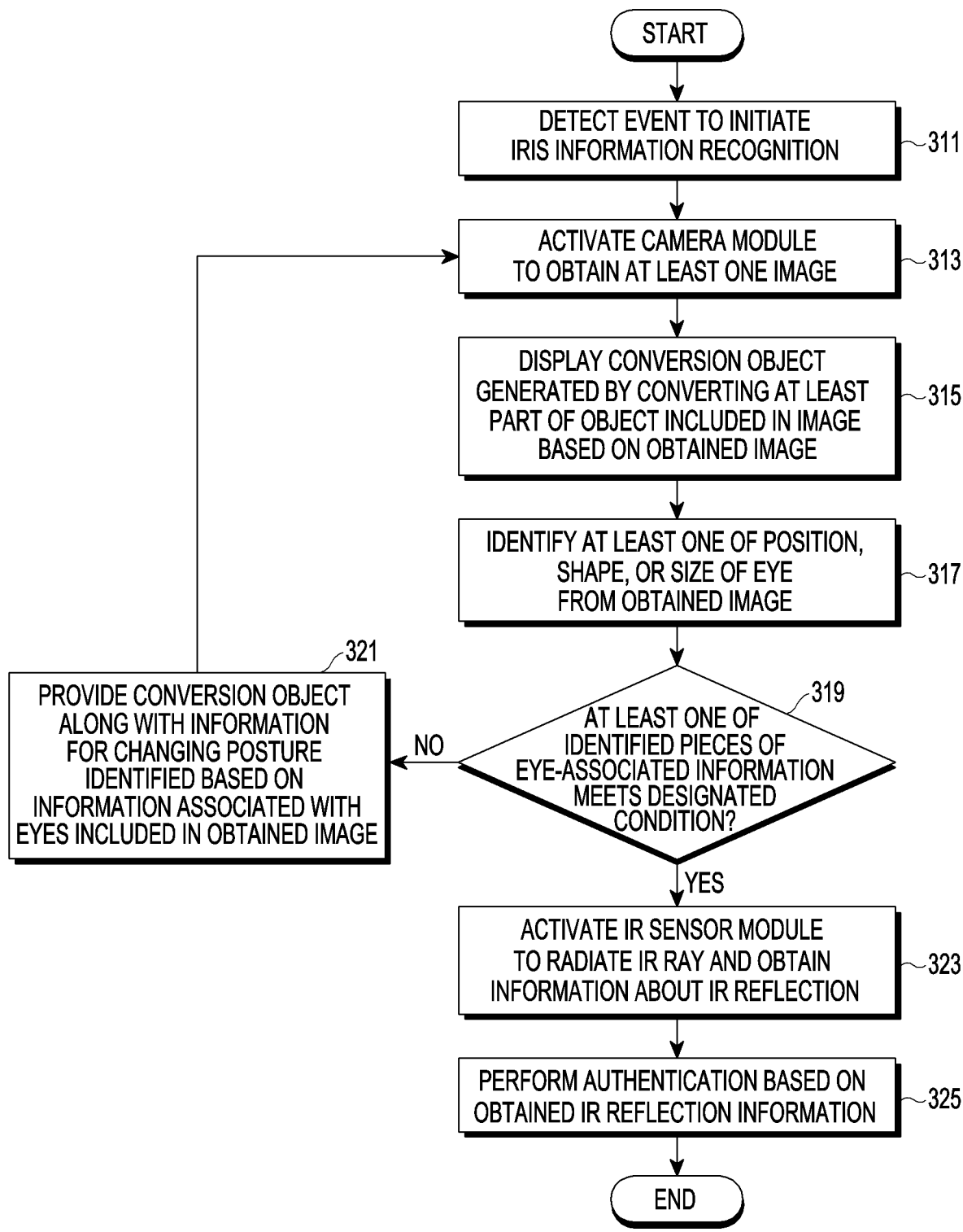
Figure 4:
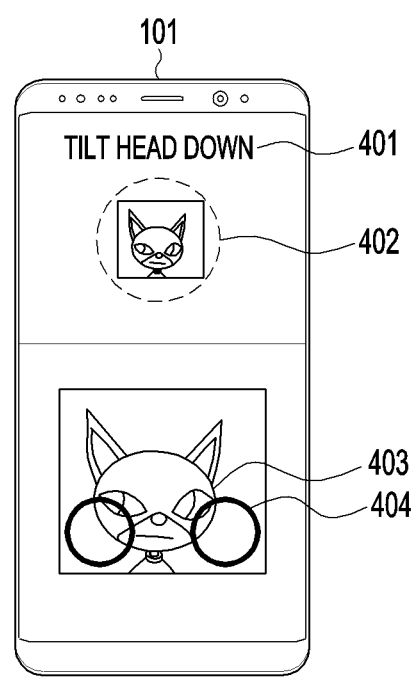
FIG. 4 is a diagram illustrating an example electronic device according to an embodiment.

FIGS. 3A and 3B are flowcharts illustrating an example method for operating an electronic device according to an embodiment. The example embodiment of FIG. 3A is described in greater detail below with reference to FIG. 4. FIG. 4 is a diagram illustrating an example configuration of an electronic device according to an embodiment of the disclosure.

Referring to FIG. 3A, the electronic device 101 may detect an event to initiate iris information recognition in operation 301. In operation 303, the electronic device 101 may activate the camera module 180 to obtain at least one image. In operation 305, the electronic device 101 may activate the infrared (IR) sensor module included in the sensor module 170 to radiate an IR ray and obtain information about the reflected IR ray.

In operation 307, the electronic device 101 may display a conversion object which is generated by converting at least part of an object contained in the image based on the obtained image. For example, the electronic device 101 may display a character 403 which is generated by converting the face included in the image, as shown in FIG. 4. For example, the electronic device 101 may extract a face region of the image obtained via the camera module 180 and identify a plurality of feature points from the extracted face region. The electronic device 101 may generate the character 403 based on, at least, the positions of the feature points identified. The electronic device 101 may determine the position of display of the character 403 based on the position of the face in the image.

In operation 309, the electronic device 101 may identify at least one of the position, shape, or size of the eyes from the obtained image. In operation 311, the electronic device 101 may provide the conversion object along with information for changing posture which is identified based on information associated with the eyes included in the obtained image until at least one of the identified eye-associated information or biometric information meets a designated condition. For example, the electronic device 101 may store relationship information between the eye-associated information and the information for changing posture as shown in Table 1.

TABLE 1

| | results of image analysis | | | | | | |
|---|---|---|---|---|---|---|---|
| | left pupil | | | | | right pupil | |
| cases | x coordinate | y coordinate | radius | width | height | x coordinate | y coordinate |
| 1 | smaller than reference | — | — | — | — | smaller than reference | — |
| 2 | smaller than reference | — | — | — | — | unidentifiable | — |
| 3 | larger than reference | — | — | — | — | larger than reference | — |
| 4 | unidentifiable | — | — | — | — | larger than reference | — |
| 5 | — | larger than reference | — | — | — | — | larger than reference |
| 6 | — | smaller than reference | — | — | — | — | smaller than reference |
| 7 | larger than reference | — | smaller than reference | — | — | larger than reference | — |
| 8 | smaller than reference | — | larger than reference | — | — | smaller than reference | — |
| 9 | — | — | — | smaller than radius | — | — | — |
| 10 | — | — | — | larger than radius | — | — | — |
| 11 | — | — | — | — | smaller than radius | — | — |
| 12 | — | — | — | — | larger than radius | — | — |

TABLE 1-continued

| | results of image analysis | | | position of user's eyes | guideline detail | |
|---|---|---|---|---|---|---|
| | right pupil | | | results of | animation | |
| cases | radius | width | height | analysis | guide | text guide |
| 1 | — | — | — | deviating to the left | emoji moves to the right in parallel | move to the right |
| 2 | — | — | — | deviating a lot to the left (only right eye recognized) | emoji moves to the right in parallel | move to the right |
| 3 | — | — | — | deviating to the right | emoji moves to the left in parallel | move to the left |
| 4 | — | — | — | deviating a lot to the right (only left eye recognized) | emoji moves to the right in parallel | move to the left |
| 5 | — | — | — | deviating upwards | emoji moves down and Parallel | move down |
| 6 | — | — | — | deviating downwards | emoji moves up and Parallel | move up |
| 7 | smaller than reference | — | — | positioned away | emoji gradually enlarges | come closer |
| 8 | larger than reference | — | — | positioned close | emoji gradually shrinks | stay away a little bit |
| 9 | — | larger than radius | — | face turns left | emoji turns right | turn head to the right |
| 10 | — | smaller than radius | — | face turns right | emoji turns left | turn head to the left |
| 11 | — | — | smaller than radius | face turns up | emoji turns down | chin down |
| 12 | — | — | larger than radius | face turns down | emoji turns up | chin up |

"-" in Table 1 may denote neglectable information. For example, the electronic device 101 may identify the position (e.g., x coordinate and y coordinate), radius, width, and height of the left and right pupils by analyzing a part of the image. Further, the electronic device 101 may store a designated reference radius and designated reference positions (e.g., x coordinate and y coordinate) for the left and right pupils. For example, when the x coordinate of the left pupil identified is smaller than the designated reference x coordinate, and the x coordinate of the right pupil identified is smaller than the designated reference x coordinate as in the first case, the electronic device 101 may identify "deviating to the left" as the result of eye position analysis. Corresponding thereto, the electronic device 101 may display an animation in which the "emoji" moves to the right in parallel," or the text "move right." For example, when the y coordinate of the left pupil identified is larger than the designated reference y coordinate, and the y coordinate of the right pupil identified is larger than the designated reference y coordinate as in the fifth case, the electronic device 101 may identify "deviating upwards" as the result of eye position analysis. The electronic device 101 may display an animation in which the "emoji" moves down and parallel," or the text "move down." For example, when the x coordinate of the left pupil identified is smaller than the designated reference x coordinate, the radius of the left pupil identified is larger than the reference radius, the x coordinate of the right pupil identified is smaller than the designated reference x coordinate, and the radius of the right pupil identified is larger than the reference radius as in the eighth case, the electronic device 101 may identify "positioned close" as the result of eye position analysis. The electronic device 101 may display an animation in which the "emoji" gradually shrinks" or the text "move away a little bit." For example, when the width of the left pupil identified is smaller than the reference radius (or the radius of the captured pupil), and the width of the right pupil identified is larger than the reference radius (or the radius of the captured pupil) as in the ninth case, the electronic device 101 may identify "face turned left" as the result of eye position analysis. The electronic device 101 may display an animation in which the "emoji turns right" or display the text "turn head to the right." For example, when the height of the left pupil identified is smaller than the reference radius (or the radius of the captured pupil), and the height of the right pupil identified is smaller than the reference radius (or the radius of the captured pupil) as in the eleventh case, the electronic device 101 may identify "face turned up" as the result of eye position analysis. The electronic device 101 may display an animation in which the "emoji turns down" or display the text "chin down." The reference positions or reference radius as shown in Table 1 may be experimentally identified and determined depending on, e.g., the positions of the camera module 180 and sensor module 170 inside the device and the specifications of the camera module 180 and the electronic device 101. Thus, the electronic device 101 may display a text guide line 401, an animation guide line 402, a character 403, and a guide line 404 indicating the reference position, e.g., as shown in FIG. 4. The reference position may be a region set corresponding to the position where biometric information is obtainable and may, for example, and without limitation, be determined experimentally or set by, e.g., the relative positions and angles of the sensor module 170 and the camera module 180. When the face object in the captured image changes in position and facial expression as the user moves, the electronic device 101 may change and display the character 403 correspondingly. Further, even when information about the eyes is changed, the electronic device 101 may, in real-time, vary and display the guide information.

According to an embodiment, the electronic device 101 may analyze the image to identify whether the user wears sunglasses or patterned contact lenses. When the user wears sunglasses or patterned contact lenses, iris recognition may be impossible. For example, when the non-recognizable region hidden by, e.g., sunglasses, is larger than the eye region, the electronic device 101 may identify that sunglasses have been worn. For example, when the non-recognizable region hidden by, e.g., contact lenses, is smaller than the eye region, the electronic device 101 may identify that contact lenses have been worn. Upon identifying that sunglasses have been worn, the electronic device 101 may provide a guide to take off the sunglasses. Upon identifying that contact lenses have been worn, the electronic device 101 may provide a user interface for other authentication schemes, such as face recognition or fingerprint recognition.

According to an embodiment, the electronic device 101 may determine whether authentication succeeds depending on whether iris information obtained matches iris information stored. For example, the electronic device 101 may detect an iris part and an eyelid part from an IR image for eyes obtained. The electronic device 101 may extract the iris part from the IR image and remove the eyelid part from the extracted iris part. The electronic device 101 may normalize the eyelid part-removed iris part and perform data encoding on the result of normalization. The electronic device 101 may compare the encoded data with stored data and, when the result of comparison reveals that they match or their matching rate is a designated value or more, the electronic device 101 may determine that authentication has succeeded. According to an embodiment, the electronic device 101 may perform, in real-time, the above-described iris authentication process while providing the conversion object and guide information.

FIG. 3B is a flowchart illustrating an example method for operating an electronic device according to an embodiment of the disclosure.

According to an embodiment, the electronic device 101 may detect an event to initiate iris information recognition in operation 311. In operation 313, the electronic device 101 may activate the camera module 180 to obtain at least one image. In operation 315, the electronic device 101 may display a conversion object which is generated by converting at least part of an object contained in the image based on the obtained image. In operation 317, the electronic device 101 may identify at least one of the position, shape, or size of the eyes from the obtained image.

In operation 319, the electronic device 101 may identify whether at least one of the pieces of eye-associated information identified meets a designated condition. Unless at least one of the pieces of eye-associated information identified is identified to meet the designated condition, the electronic device 101 may, in operation 321 ("No" in operation 319), provide the conversion object along with information for changing posture identified based on the information associated with the eyes included in the obtained image. When at least one of the pieces of eye-associated information identified meets the designated condition, the electronic device 101 may, in operation 323 ("Yes" in operation 319), activate the IR sensor module to radiate an IR ray and obtain information about the reflected IR ray. In operation 325, the electronic device 101 may perform authentication based on the obtained IR reflection information.

Figure 5A:
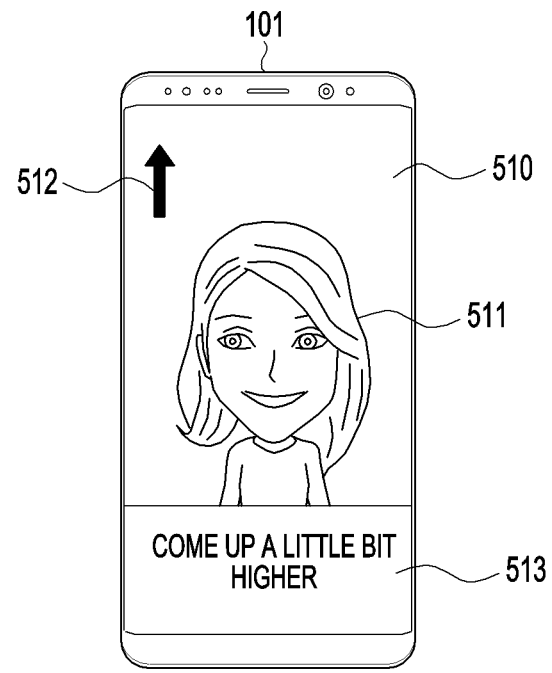
FIGS. 5A and 5B are diagrams illustrating an example image obtained via a camera module and example screens displayed on a display according to an embodiment.
Figure 5A:
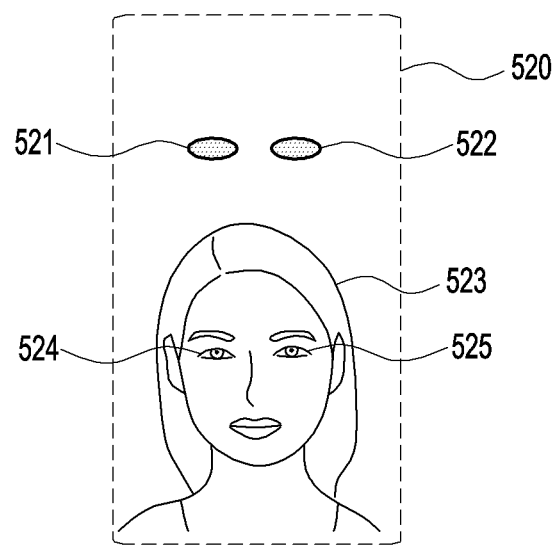
Figure 5B:
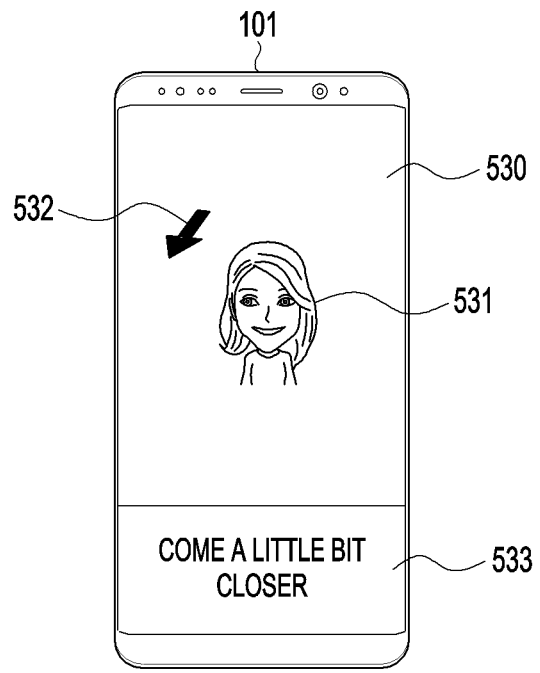
Figure 5B:
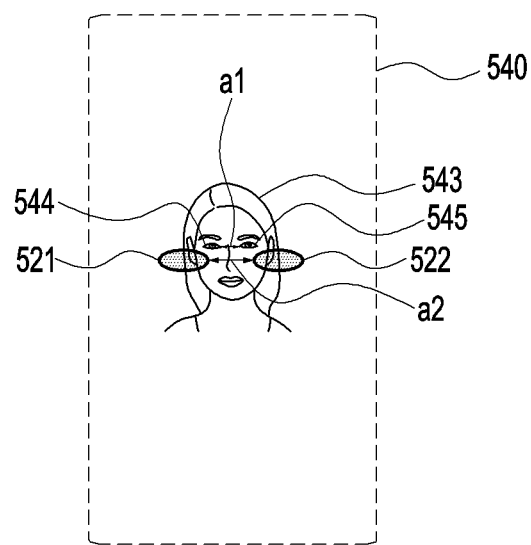

FIGS. 5A and 5B are diagrams illustrating an example image obtained via a camera module and example screens displayed on a display according to an embodiment.

Referring to FIG. 5A, the electronic device 101 may obtain a first image 520 using the camera module 180. As set forth above, the captured first image 520 may not be displayed on the display 160. The first image 520 may include a face object 523, and the face object 523 may include a right eye object 524 and a left eye object 525. The electronic device 101 may store information (e.g., x coordinate, y coordinate, radius, width, and height) about a reference range 521 of the right object in the image and a reference range 522 of the left eye object in the image. The electronic device 101 may identify that the y coordinate of the right eye object 524 identified is smaller than the y coordinate of the reference range 521 of the right eye object. The electronic device 101 may identify "deviating downwards" as the result of analyzing the position of the user's eyes. The electronic device 101 may display a first screen 510 including at least one piece of guide information 512 and 513 and the conversion object 511. For example, the conversion object 523 may be an emoji generated from the face object 523. The emoji may be varied and displayed corresponding to a variation in the position, shape, or facial expression of the face in the image 520. The electronic device 101 may extract feature points from the face in the image 520, identify a variation in facial expression based on a variation in position of the feature points, and correspondingly vary and display the emoji. The electronic device 101 may display guide information 512, e.g., an arrow indicating the direction in which the user needs to move the user's eyes and guide information 513 which is the text "move up a little bit."

Referring to FIG. 5B, the electronic device 101 may obtain a second image 540 using the camera module 180. The second image 540 may include a face object 543, and the face object 543 may include a right eye object 544 and a left eye object 545. As shown in FIG. 5B, information (e.g., x coordinate, y coordinate, radius, width, and height) about the reference range 521 of the right object and the reference range 522 of the left eye object may be set to be the same for all the images. The electronic device 101 may identify that the size of the right eye object 544 identified is smaller than the size of the reference range 521 of the right eye object. The electronic device 101 may identify "positioned away" as the result of analyzing the position of the user's eyes. The electronic device 101 may display a second screen 530 including at least one piece of guide information 532 and 533 and the conversion object 531. For example, the conversion object 533 may be an emoji generated from the face object 523. The electronic device 101 may display guide information 532, e.g., an arrow indicating the direction in which the user needs to move the user's eyes and guide information 533 which is the text "move forward a little bit."

According to an embodiment, the electronic device 101 may identify that the distance a2 between the right eye object 544 and the left eye object 545 is smaller than the distance a1 between the reference range 521 of the right eye object and the reference range 522 of the left eye object. Based thereupon, the electronic device 101 may identify "positioned away" as the result of analyzing the position of the user's eyes. Although not shown, when the distance between the right eye object and the left eye object is identified to be larger than the distance a1 between the reference range 521 of the right eye object and the reference range 522 of the left eye object, the electronic device 101 may identify "positioned close" as the result of analyzing the position of the user's eyes.

Figure 6A:
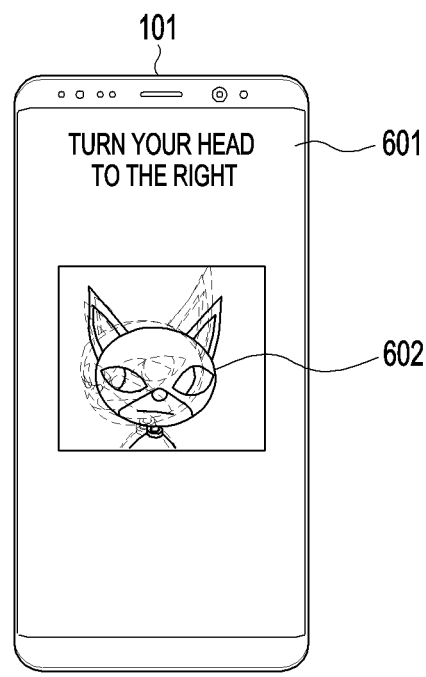
FIGS. 6A and 6B are diagrams illustrating an example animation guide provided by an electronic device according to an embodiment.
Figure 6B:

FIGS. 6A and 6B are diagrams illustrating an example animation guide provided by an electronic device according to an embodiment.

Referring to FIG. 6A, the electronic device 101 may identify "face turned left" as the result of analyzing the position of the user's eyes. The electronic device 101 may display the text guide 601 reading "turn head to the right." Further, the electronic device 101 may display an animation 602 in which the conversion object turns its face to the right. For example, the electronic device 101 may display the animation 602 by sequentially displaying a plurality of images 611, 612, and 613 constituting the animation 602 as shown in FIG. 6B. The electronic device 101 may apply an after-image effect while providing the plurality of images 611, 612, and 613. For example, the electronic device 101 may adjust the transparency of at least part of the image 611 at the time of displaying the image 612 while displaying the image 611 and may display it along with the image 612.

Figure 6C:
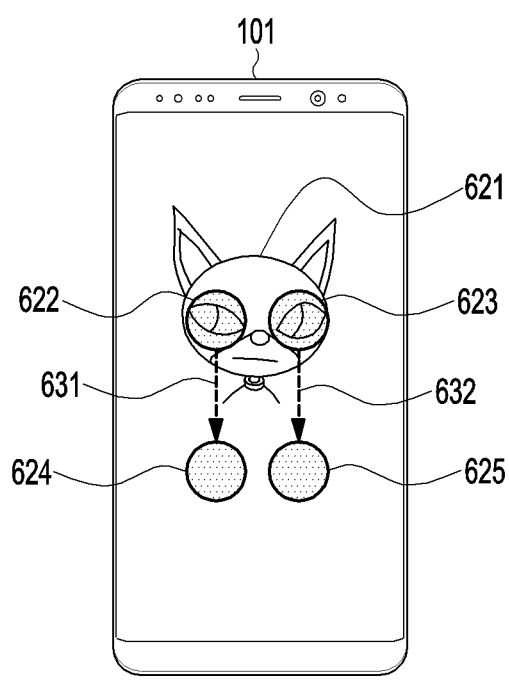
FIG. 6C is a diagram illustrating an example guide according to an embodiment.

FIG. 6C is a diagram illustrating an example guide according to an embodiment.

Referring to FIG. 6C, the electronic device 101 may identify "face deviates to the left" as the result of analyzing the position of the user's eyes. The electronic device 101 may display guides 624 and 625 to indicate reference ranges and a conversion object 621. The electronic device 101 may display guides 622 and 623 to indicate parts corresponding to the eyes of the conversion object 621. The electronic device 101 may determine at least one of the position, shape, or size of the guides 622 and 623 based on at least one of the position, shape, or size of the eye regions included in the captured image and display the determined guides 622 and 623 in the parts corresponding to the eyes of the conversion object 621.

The electronic device 101 may display arrows 631 and 632 corresponding to the differences between the guides 624 and 625 indicating the reference ranges and the guides 622 and 623 corresponding to the eye regions in the obtained image. The user may identify the arrows 631 and 632 and change the user's posture. Further, the user may move forward or backward depending on the size of the guides 622 and 623. Although FIG. 6C illustrates that the guides 622 and 623 are similar in size to the guides 624 and 625 indicating the reference ranges, this is merely an example, and the disclosure is not limited thereto. For example, when the user is positioned farther away from the electronic device 101 than the reference distance, the guides 622 and 623 may be displayed in a smaller size than the guides 624 and 625 indicating the reference ranges.

Figure 7:
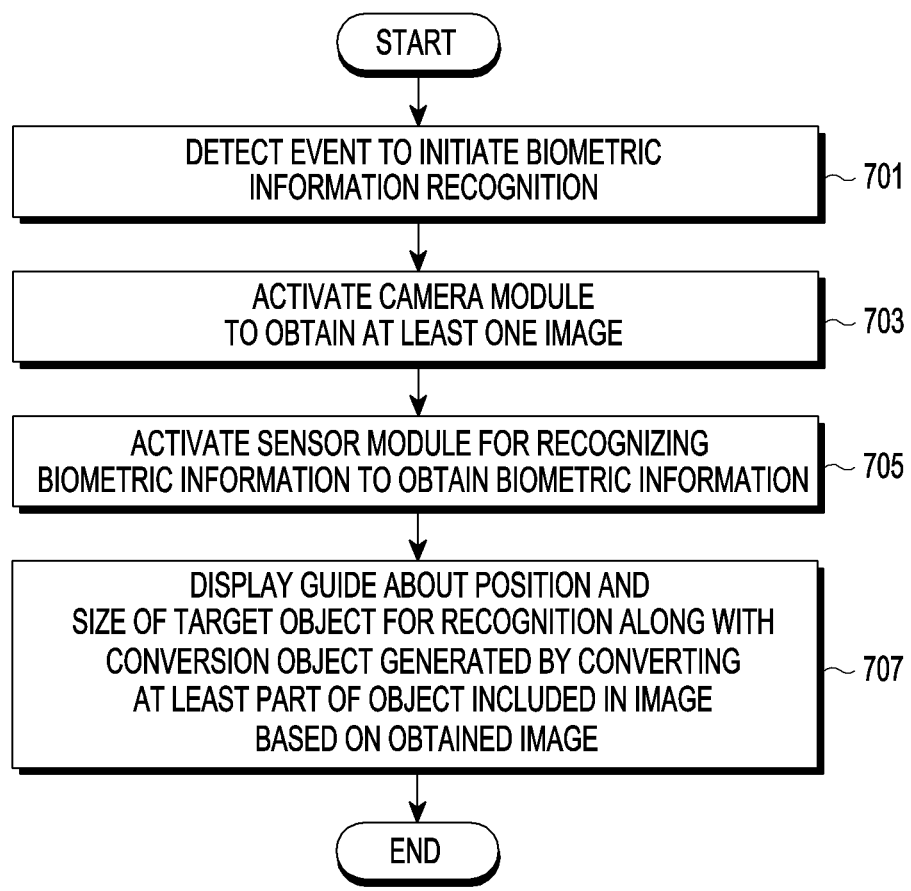
FIG. 7 is a flowchart illustrating an example method of operating an electronic device according to an embodiment.
Figure 8:
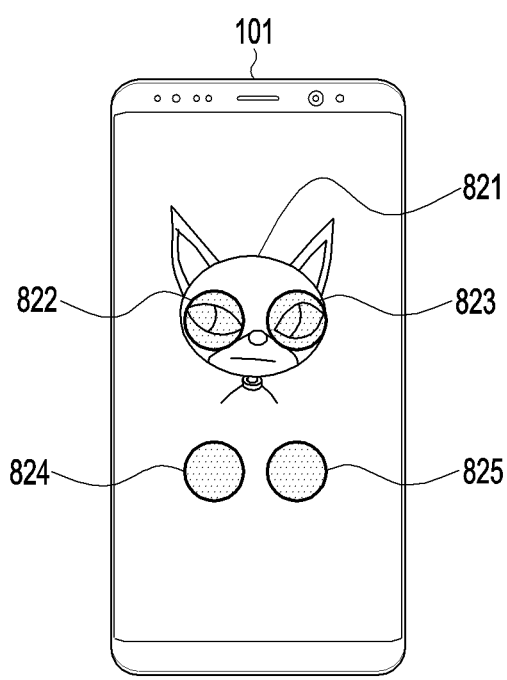
FIG. 8 is a diagram illustrating an example guide displayed by an electronic device according to an embodiment.

FIG. 7 is a flowchart illustrating an example method for operating an electronic device according to an embodiment of the disclosure. An example embodiment is described in detail with reference to FIG. 7 along with FIG. 8. FIG. 8 is a diagram illustrating an example guide displayed by an electronic device according to an embodiment.

According to an embodiment, the electronic device 101 may detect an event to initiate biometric information recognition in operation 701. In operation 703, the electronic device 101 may activate the camera module 180 to obtain at least one image. In operation 705, the electronic device 101 may activate the sensor module 170 for recognizing biometric information and obtain biometric information. In operation 707, the electronic device 101 may display a conversion object, which is generated by converting at least part of an object included in an obtained image based on the image, along with a guide for the position and size of the target object for recognition. For example, as shown in FIG. 8, the electronic device 101 may display guides 824 and 825 corresponding to the designated ranges and the conversion object 821. The electronic device 101 may additionally display guides 822 and 823 corresponding to the eye regions of the conversion object 821.

Figure 9:
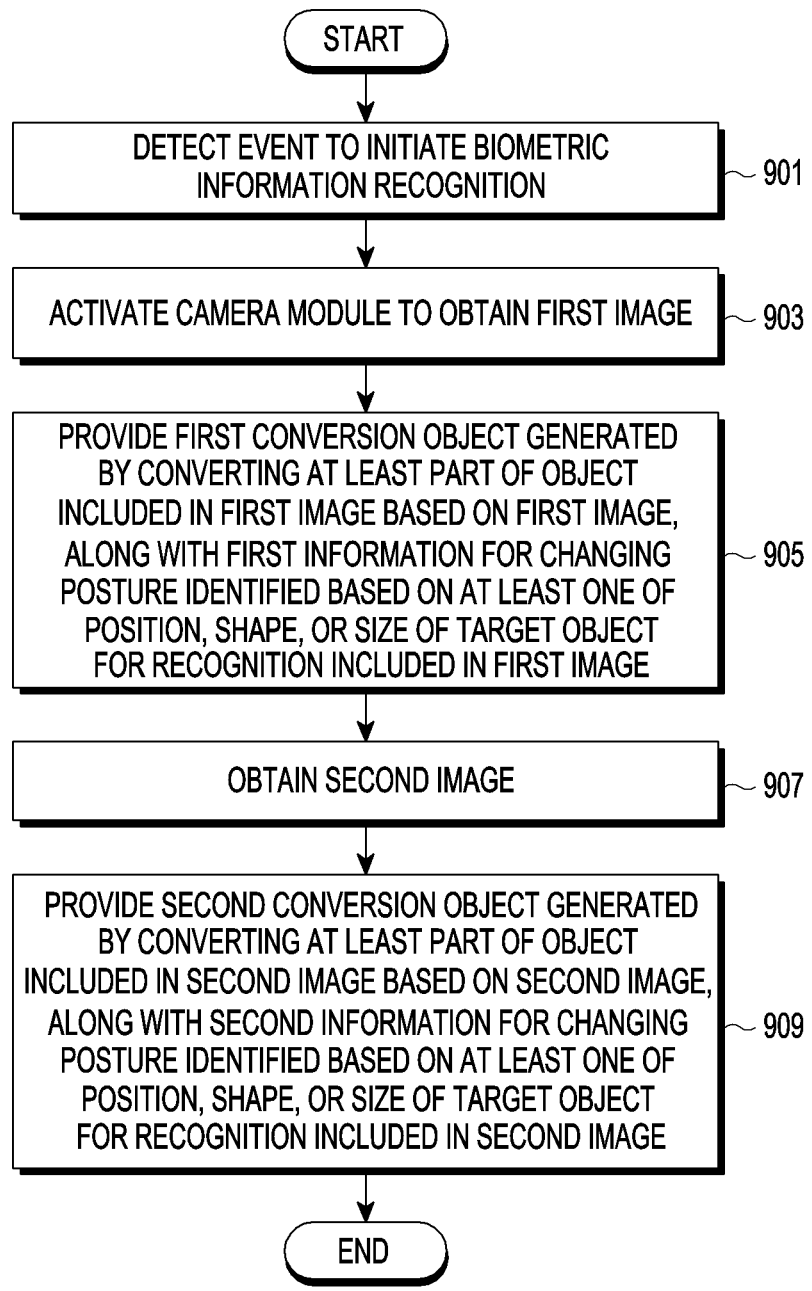
FIG. 9 is a flowchart illustrating an example method of operating an electronic device according to an embodiment.
Figure 10:
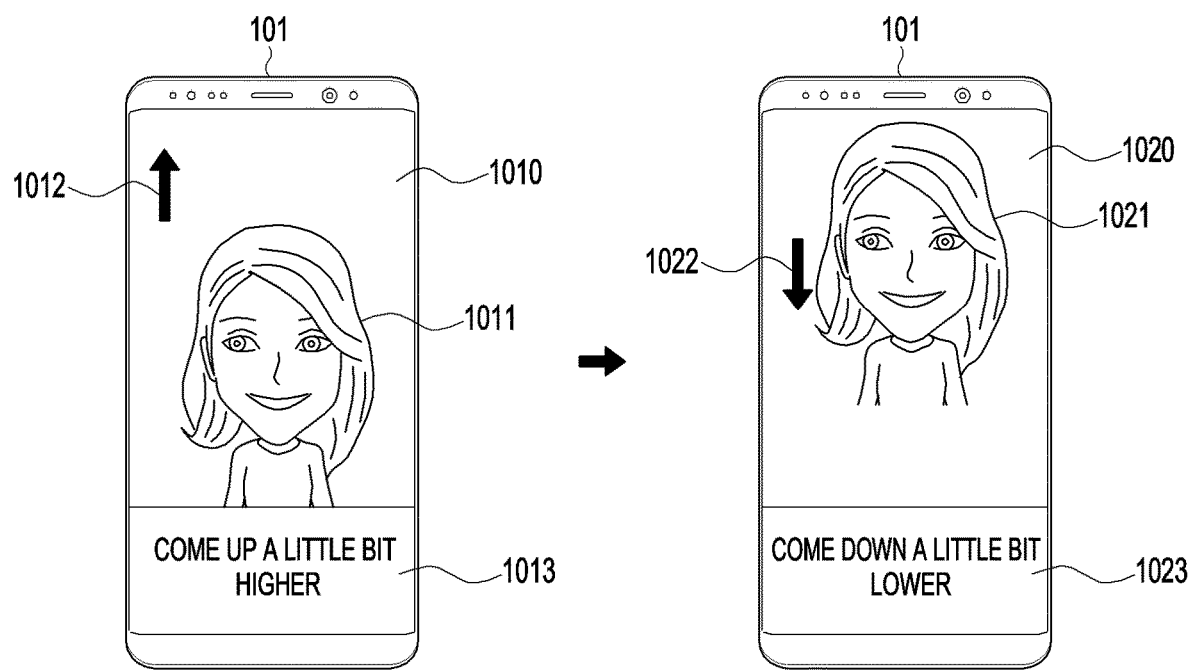
FIG. 10 is a diagram illustrating an example screen displayed by an electronic device according to an embodiment.

FIG. 9 is a flowchart illustrating an example method for operating an electronic device according to an embodiment of the disclosure. An example embodiment is described in greater detail with reference to FIG. 9 along with FIG. 10. FIG. 10 is a diagram illustrating an example screen displayed by an electronic device according to an embodiment.

According to an embodiment, the electronic device 101 may detect an event to initiate biometric information recognition in operation 901. In operation 903, the electronic device 101 may activate the camera module 180 to obtain a first image. In operation 905, the electronic device 101 may provide a first conversion object, which is generated by converting at least part of an object included in the first image based on the first image, along with first information for changing posture identified based on at least one of the position, shape, or size of an target object for recognition included in the first image. As shown in FIG. 10, the electronic device 101 may display a first screen 1010. The first screen 1010 may include guides 1012 and 1013 and a conversion object 1011 generated based on the face included in the first image. For example, the electronic device 101 may identify that the target object for recognition (e.g., eyes) included in the first image is positioned below the reference position. Therefore, the electronic device 101 may display guides 1012 and 1013 indicating a request to move up.

In operation 907, the electronic device 101 may obtain a second image. For example, the user may identify the guides 1012 and 1013 and correspondingly tilt the user's head up, and the electronic device 101 may obtain the second image after the user tilts the user's head up. In operation 909, the electronic device 101 may provide a second conversion object, which is generated by converting at least part of an object included in the second image based on the second image, along with second information for changing posture identified based on at least one of the position, shape, or size of an target object for recognition included in the second image. As shown in FIG. 10, the electronic device 101 may display a second screen 1020 based on the second image. The second screen 1020 may include guides 1022 and 1023 and a conversion object 1021 generated based on the face included in the second image. For example, the electronic device 101 may identify that the target object for recognition (e.g., eyes) included in the second image is positioned above the reference position. Therefore, the electronic device 101 may display guides 1022 and 1023 indicating a request to move down. In other words, the electronic device 101 may vary and display, in real-time, the guides corresponding to a variation in at least one of the position, size, or shape of the target object for recognition in the image.

Figure 11:
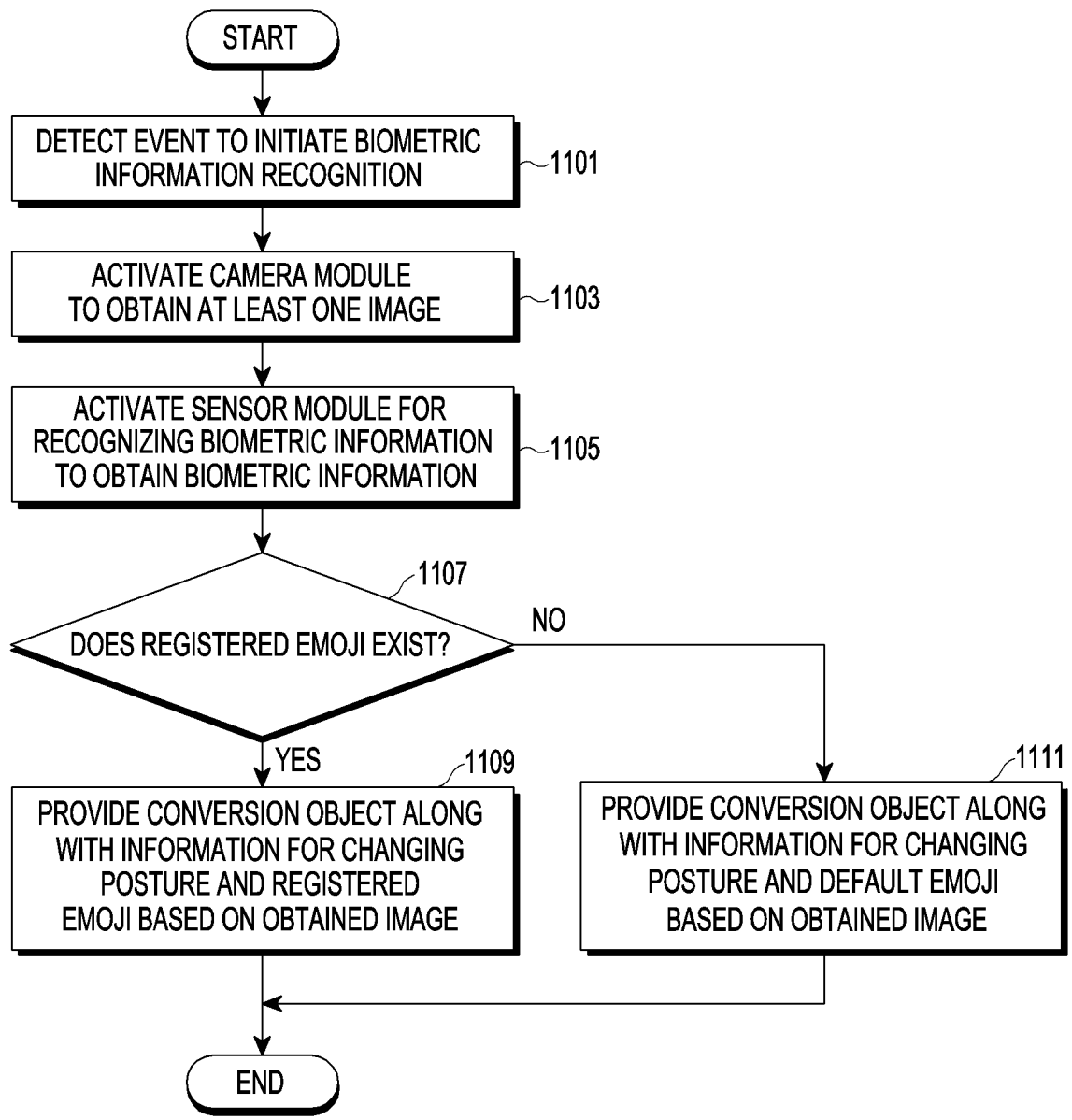
FIG. 11 is a flowchart illustrating an example method of operating an electronic device according to an embodiment.

FIG. 11 is a flowchart illustrating an example method for operating an electronic device according to an embodiment of the disclosure.

According to an embodiment, the electronic device 101 may detect an event to initiate biometric information recognition in operation 1101. In operation 1103, the electronic device 101 may activate the camera module 180 to obtain at least one image. In operation 1105, the electronic device 101 may activate the sensor module 170 for recognizing biometric information and obtain biometric information. In operation 1107, the electronic device 101 may identify whether a registered emoji exists. The electronic device 101 may previously perform emoji registration before recognizing biometric information. For example, the electronic device 101 may previously obtain an image captured of the user's face to register an emoji. The electronic device 101 may generate an emoji from the captured image based on the above-described scheme and register the emoji. Upon determining that there is an emoji previously registered ("Yes" in operation 1107), the electronic device 101 may, in operation 1109, provide a conversion object along with information for changing posture and the registered emoji based on the obtained image. Upon determining that there is no emoji previously registered ("No" in operation 1107), the electronic device 101 may, in operation 1111, provide a conversion object along with information for changing posture and a default emoji based on the obtained image. The default image may, for example, be an emoji generated based on pre-designated texture, but not an emoji generated based on the texture from the captured image. When the time required to generate an emoji is relatively longer than the time required for biometric authentication, the electronic device 101 may display, e.g., a predesignated character.

Figure 12:
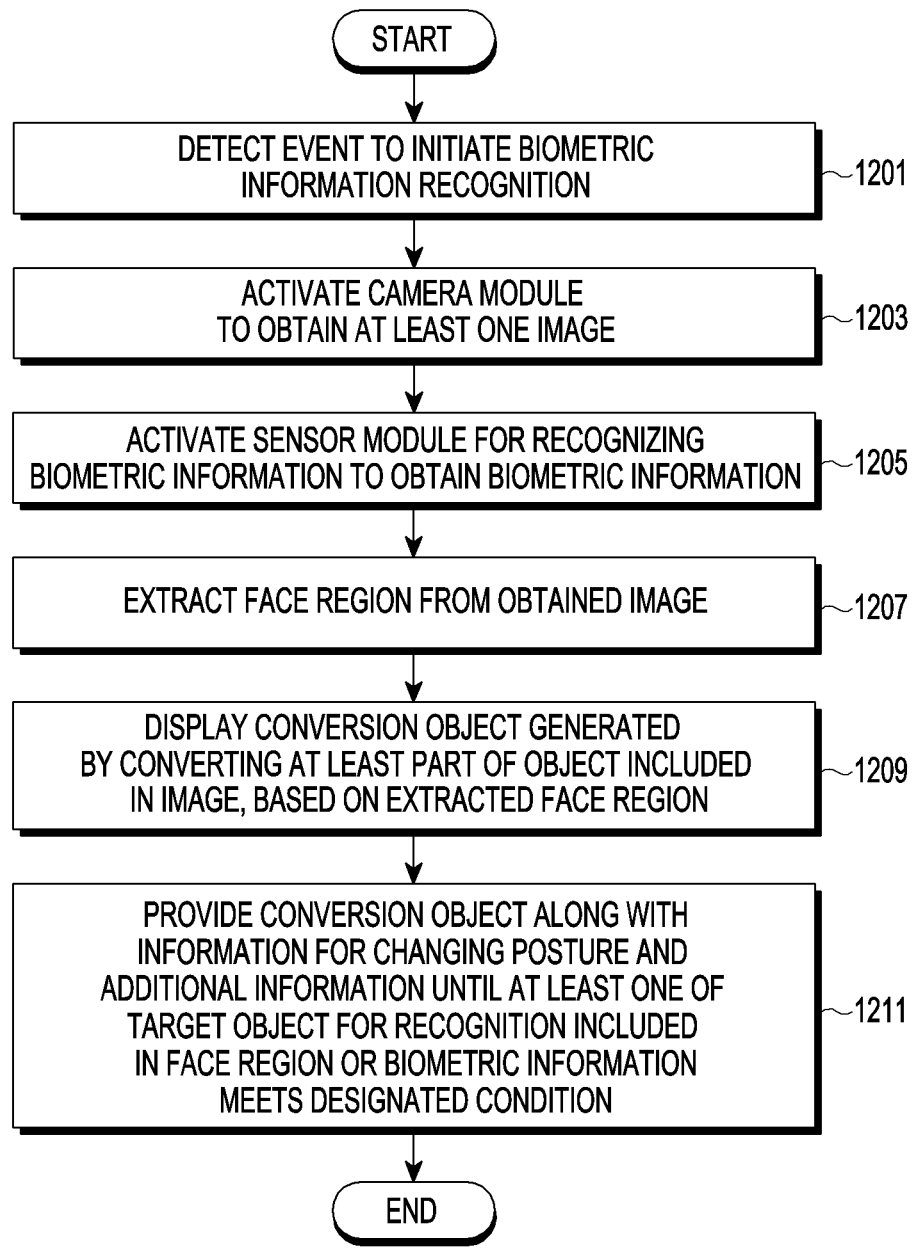
FIG. 12 is a flowchart illustrating an example method of operating an electronic device according to an embodiment.

FIG. 12 is a flowchart illustrating an example method for operating an electronic device according to an embodiment of the disclosure.

According to an embodiment, the electronic device 101 may detect an event to initiate biometric information recognition in operation 1201. In operation 1203, the electronic device 101 may activate the camera module 180 to obtain at least one image. In operation 1205, the electronic device 101 may activate the sensor module 170 for recognizing biometric information and obtain biometric information. In operation 1207, the electronic device 101 may extract a face region from the obtained image. As set forth above, the electronic device 101 may extract the face region based on various face region detection schemes which are not limited to a particular one. The electronic device 101 may extract the face region and may not use the remaining background region. Accordingly, the background region may be prevented from being displayed on the display 160, which may further ensure the user's privacy.

In operation 1209, the electronic device 101 may display a conversion object which is generated by converting at least part of an object contained in the image based on the extracted face region. In operation 1211, the electronic device 101 may provide information for changing posture and additional information along with the conversion object until at least one of the target object for recognition included in the face region or biometric information meets a designated condition. According to an embodiment, the electronic device 101 may display the additional information in the background region except for the conversion object. For example, the electronic device 101 may display an interface for additional authentication in the background region. When the electronic device 101 has been configured to be authenticated in a multi-factor authentication scheme, the electronic device 101 may display the interface for additional authentication in the background region. The electronic device 101 may display authentication-associated information (e.g., payment information or remittance information). It will readily be appreciated by one of ordinary skill in the art that additional information displayable in the background region is not limited to a particular type. The electronic device 101 may display information for changing posture in the background region in which case no additional information may be displayed. According to an embodiment, the electronic device 101 may blur and display the background region. In this case, the electronic device 101 may display the blurred background region and a conversion object along with the information for changing posture. According to an embodiment, the electronic device 101 may be configured to display the background region obtained from the image, along with the conversion object.

Figure 13:
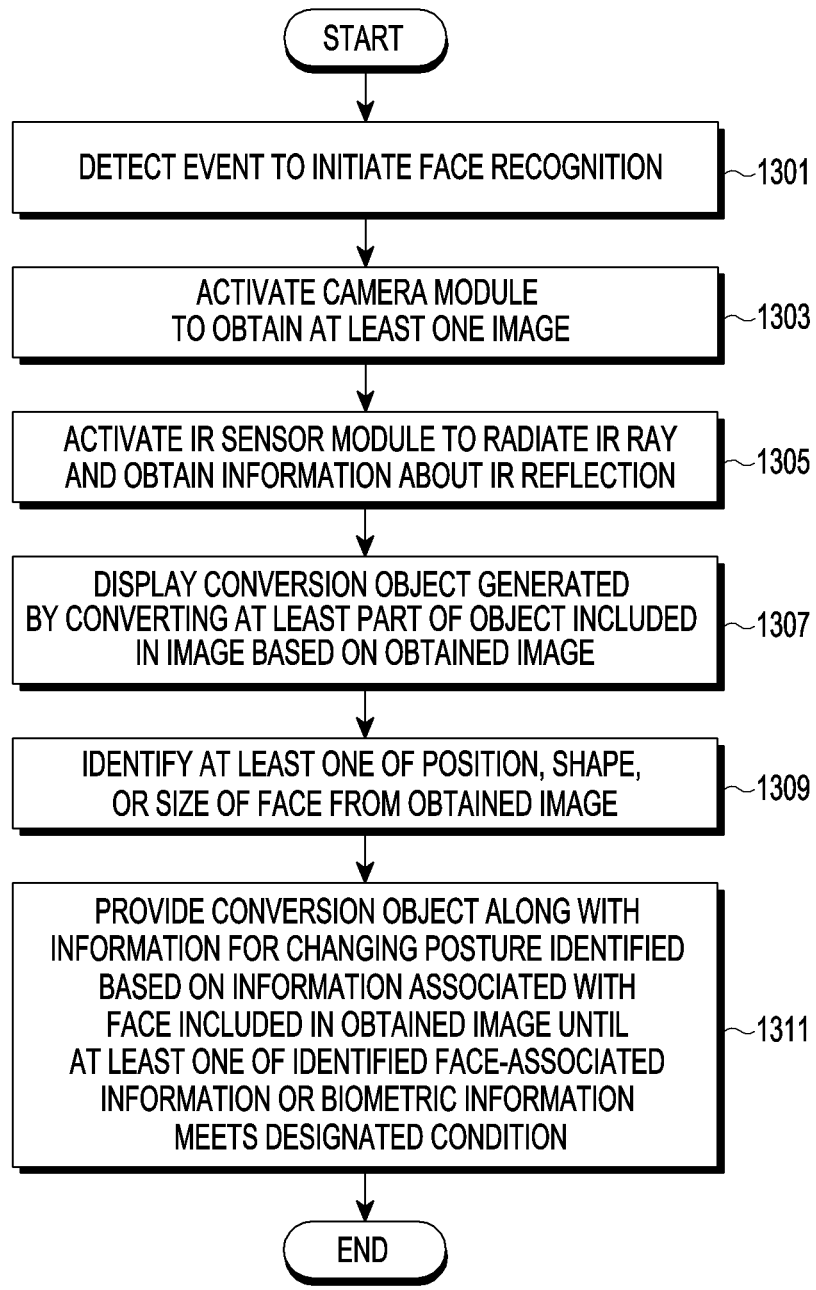
FIG. 13 is a flowchart illustrating an example method of operating an electronic device according to an embodiment.
Figure 14:
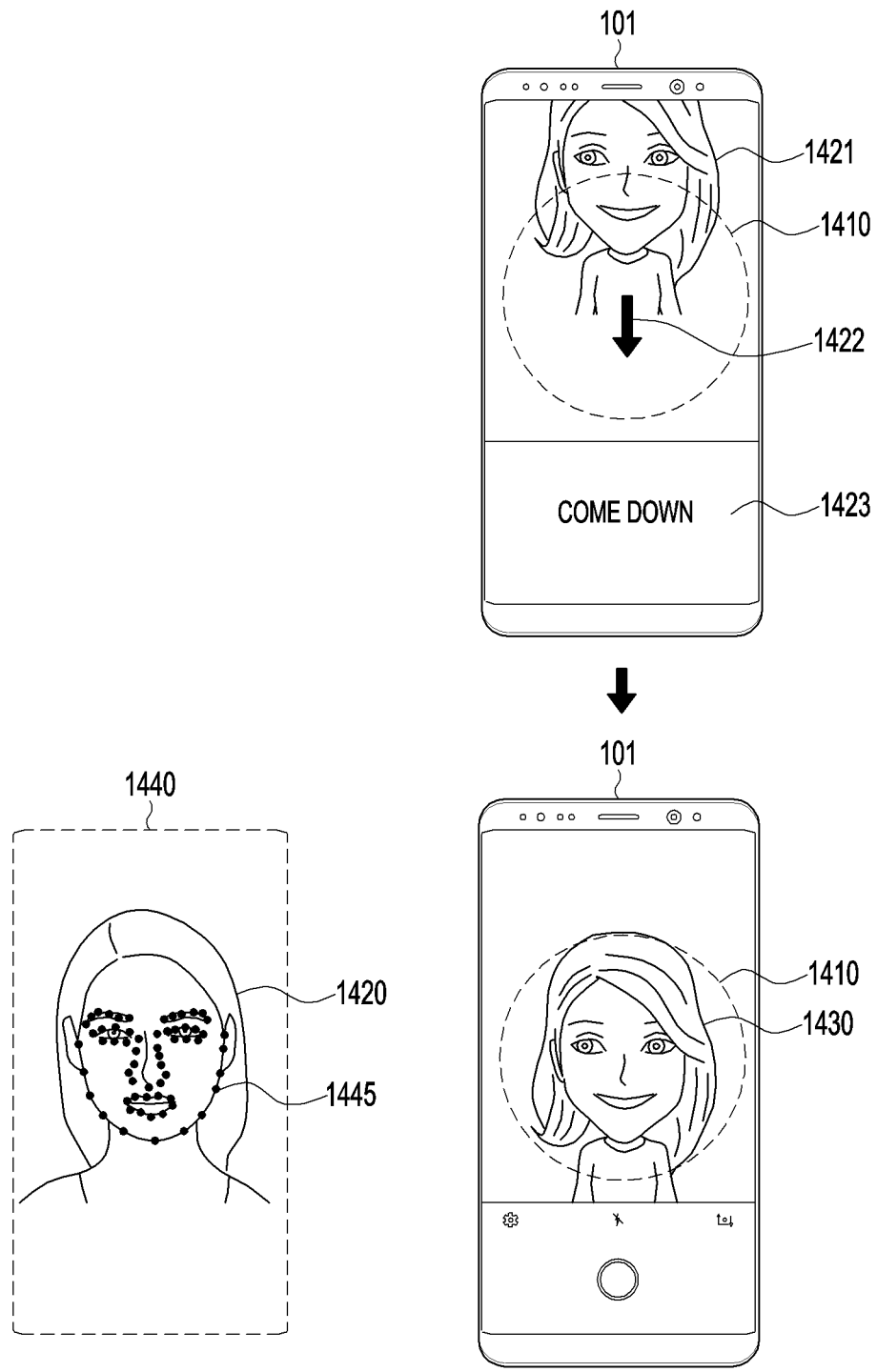
FIG. 14 is a diagram illustrating an example display screen of an electronic device according to an embodiment.

FIG. 13 is a flowchart illustrating an example method for operating an electronic device according to an embodiment of the disclosure. An example embodiment related to FIG. 13 is described in greater detail with reference to FIG. 14. FIG. 14 is a diagram illustrating an example display screen of an electronic device according to an embodiment.

According to an embodiment, the electronic device 101 may detect an event to initiate face recognition in operation 1301. The event to initiate face recognition may at least partially be the same as the event to initiate iris recognition described above. In operation 1303, the electronic device 101 may activate the camera module 180 to obtain at least one image. In operation 1305, the electronic device 101 may activate the infrared (IR) sensor module included in the sensor module 170 to radiate an IR ray and obtain information about the reflected IR ray. For example, the electronic device 101 may radiate an IR ray in a grid shape including of a plurality of dots. Accordingly, the electronic device 101 may obtain a two-dimensional (2D) or three-dimensional (3D) IR image for the face. In operation 1307, the electronic device 101 may display a conversion object which is generated by converting at least part of an object contained in the image based on the obtained image. For example, as shown in FIG. 14, the electronic device 101 may display a conversion object 1421, a guide 1410 for a designated region, and guides 1422 and 1423 to lead to posture change.

In operation 1309, the electronic device 101 may identify at least one of the position, shape, or size of the face from the obtained image. In operation 1311, the electronic device 101 may provide the conversion object along with information for changing posture, which is identified based on information associated with the face included in the obtained image until at least one of the identified face-associated information or biometric information, e.g., information identified based on the IR image for the face meets a designated condition. For example, the electronic device 101 may provide guides 1422 and 1423 until feature points 1445 extracted from the face region 1420 of the IR image 1440 for the face meet a designated condition. Although FIG. 14 illustrates that the IR image 1440 is a 2D IR image, this is merely an example. The electronic device 101 may obtain a 3D IR image and extract feature points from the 3D IR image. The electronic device 101 may display a conversion object 1430, which has been repositioned, even while identifying whether the feature points 1445 match pre-stored feature points. According to an embodiment, the electronic device 101 may obtain an IR image for face at the time of first registering the user's face and store the positions of the feature points extracted from the IR image. The electronic device 101 may compare information about the stored feature points with information about the feature points obtained from the IR image and, when determined to match, may determine that authentication succeeds.

According to an embodiment, the electronic device 101 may be configured to display a conversion object based on an IR image obtained via the sensor module 170 without activating the camera module 180.

Figure 15:
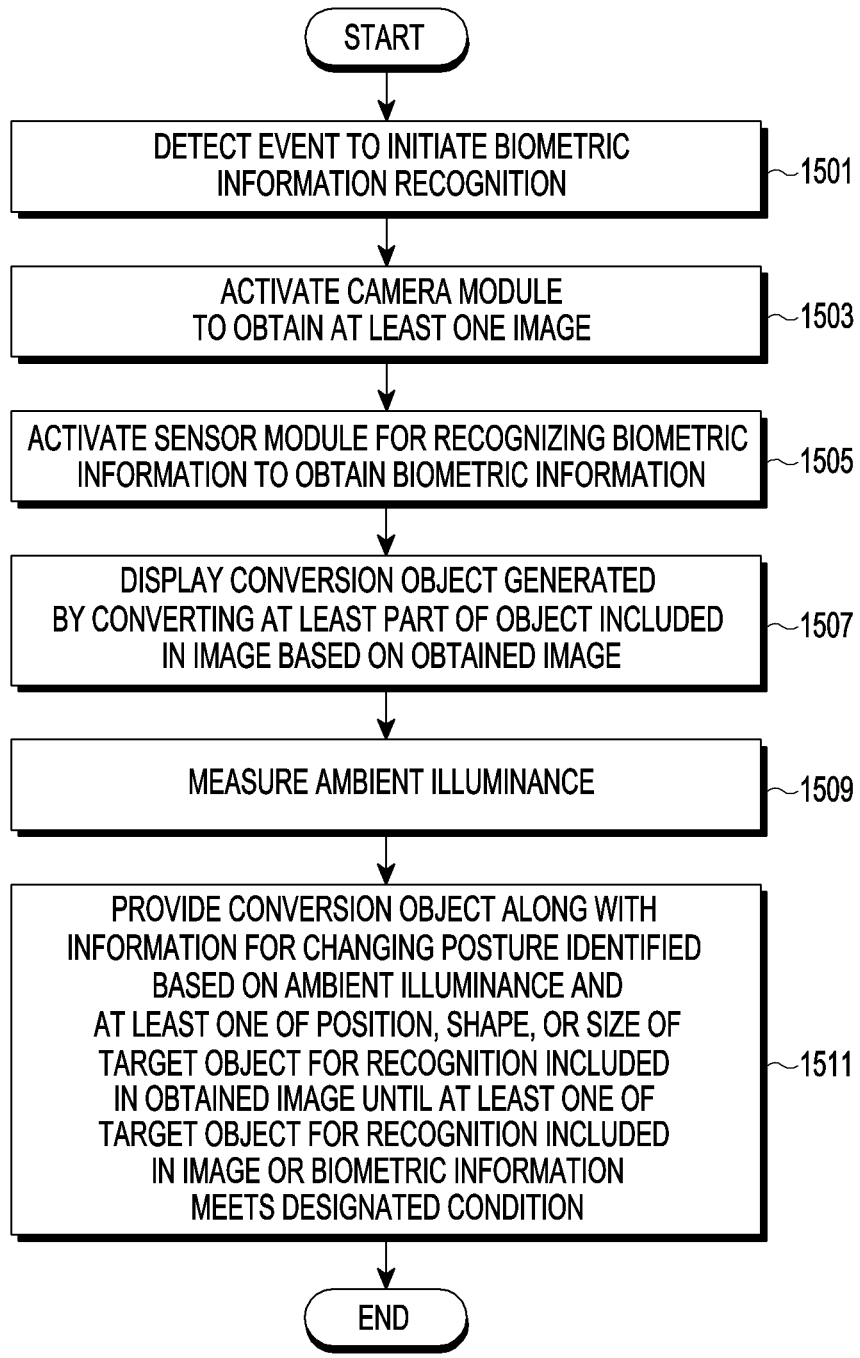
FIG. 15 is a flowchart illustrating an example method of operating an electronic device according to an embodiment.
Figure 16:
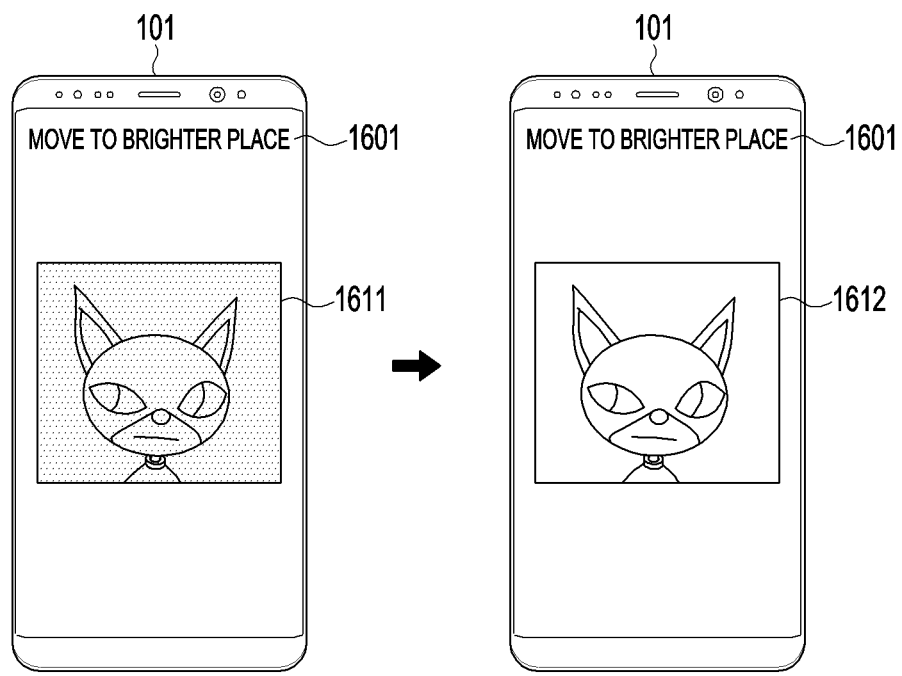
FIG. 16 is a diagram illustrating an example electronic device according to an embodiment.

FIG. 15 is a flowchart illustrating an example method for operating an electronic device according to an embodiment of the disclosure. An example embodiment is described in detail with reference to FIG. 15 along with FIG. 16. FIG. 16 is a diagram illustrating an example electronic device according to an embodiment.

Referring to FIG. 15, the electronic device 101 may detect an event to initiate biometric information recognition in operation 1501. In operation 1503, the electronic device 101 may activate the camera module to obtain at least one image. In operation 1505, the electronic device 101 may activate the sensor module for recognizing biometric information and obtain biometric information. In operation 1507, the electronic device 101 may display a conversion object which is generated by converting at least part of an object contained in the image based on the obtained image.

According to an embodiment, the electronic device 101 may measure the ambient illuminance in operation 1509. For example, the electronic device 101 may identify the ambient illuminance by analyzing at least one image obtained via the camera module. The electronic device 101 may identify the ambient illuminance based on the pixel value included in the image. The electronic device 101 may identify the ambient illuminance based on biometric information obtained via the sensor module. For example, the electronic device 101 may obtain an IR image captured of a body part targeted for authentication based on the IR sensor. The electronic device 101 may identify the ambient illuminance based on the pixel value included in the IR image. The electronic device 101 may activate the illuminance sensor and identify the ambient illuminance based on sensing data identified via the illuminance sensor. The electronic device 101 may receive information about the ambient illuminance from an external electronic device (e.g., an external illuminance sensor or external server).

In operation 1511, the electronic device 101 may provide the conversion object along with information for changing posture, which is identified based on the ambient illuminance and at least one of the position, shape, or size of the target object for recognition included in the obtained image until at least one of the biometric information or the target object for recognition included in the image meets a designated condition. The electronic device 101 may provide the conversion object along with information for changing the illuminance environment identified based on the ambient illuminance. For example, as shown in FIG. 16, the electronic device 101 may display the text 1601 requesting to increase the illuminance, "Move to brighter place." Further, the electronic device 101 may display an image 1612 to indicate a relatively bright environment while displaying an image 1611 to indicate a relatively dark environment. Accordingly, the user may move from the relatively dark environment to the relatively bright environment or identify the need for changing illuminance. The image 1611 to indicate the relatively dark environment and the image 1612 to indicate the relatively bright environment may include the conversion object and information for changing posture identified based on at least one of the position, shape, or size of the target object for recognition included in the obtained image. Information indicating the overall brightness (e.g., at least one of lightness or chroma) or the background of the image 1612 indicating the relatively bright environment and the image 1611 indicating the relatively dark environment may be determined.

Figure 17:
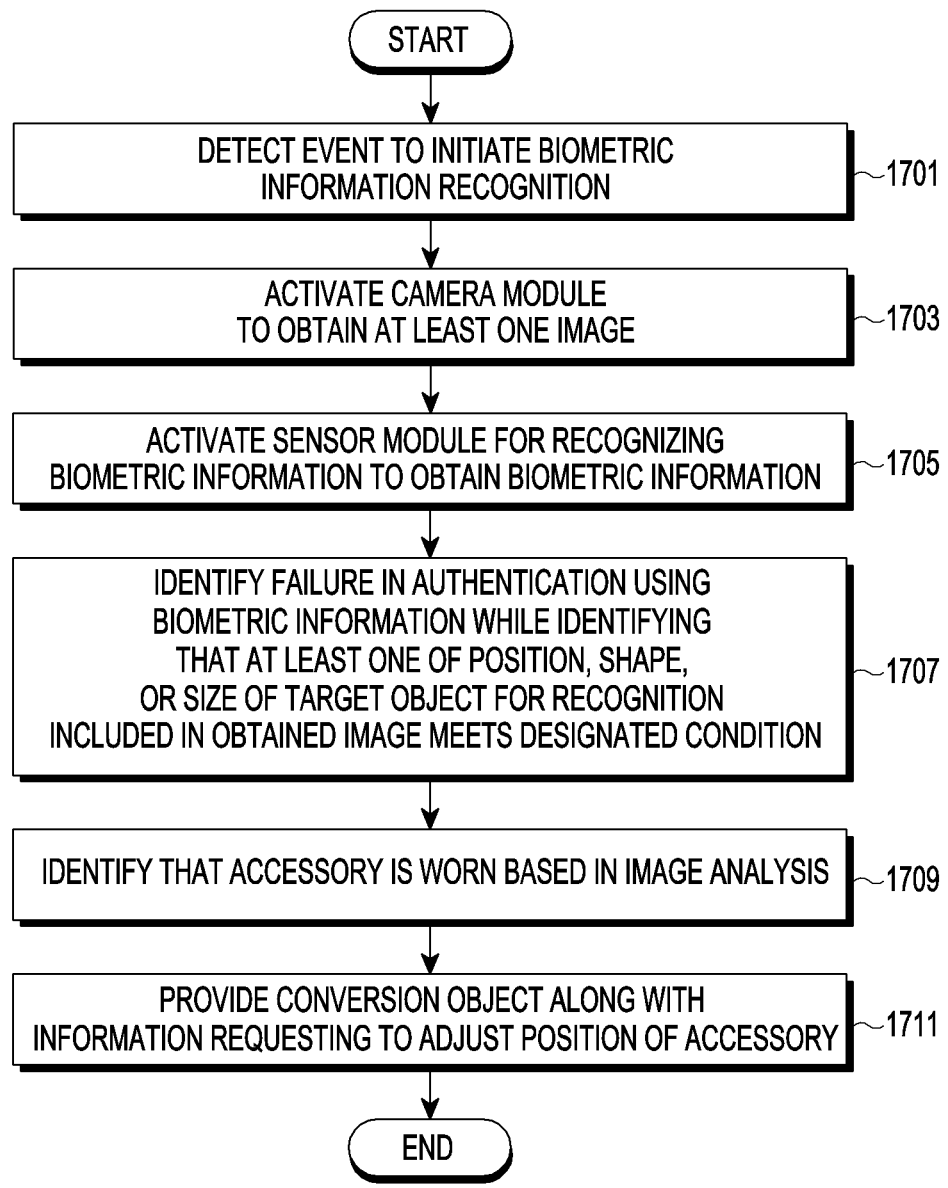
FIG. 17 is a flowchart illustrating an example method of operating an electronic device according to an embodiment.
Figure 18:
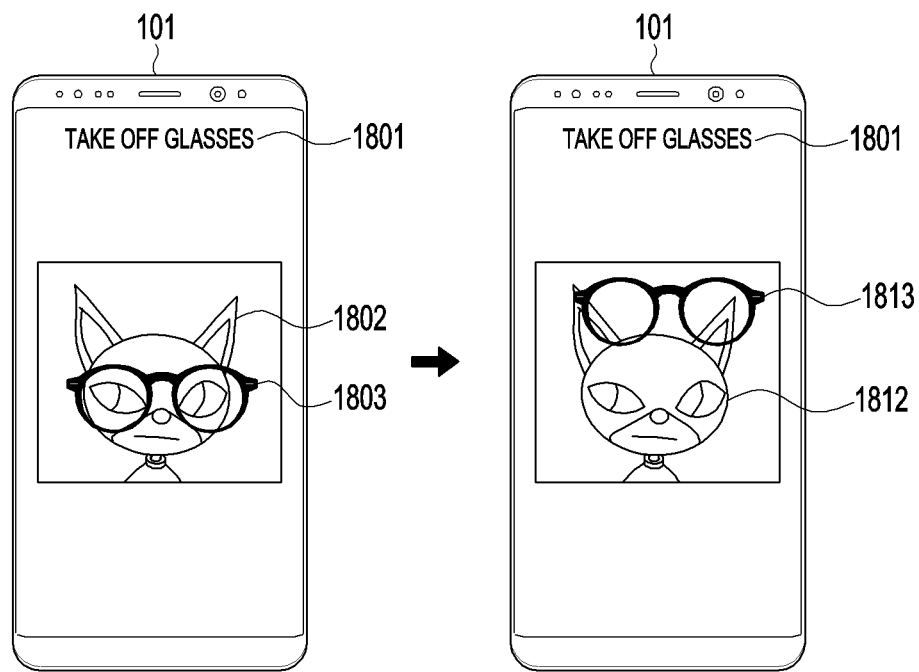
FIG. 18 is a diagram illustrating an example electronic device according to an embodiment.

FIG. 17 is a flowchart illustrating an example method for operating an electronic device according to an embodiment of the disclosure. An example embodiment is described in detail with reference to FIG. 17 along with FIG. 18. FIG. 18 is a diagram illustrating an electronic device according to an embodiment.

Referring to FIG. 17, the electronic device 101 may detect an event to initiate biometric information recognition in operation 1701. In operation 1703, the electronic device 101 may activate the camera module to obtain at least one image. In operation 1705, the electronic device 101 may activate the sensor module for recognizing biometric information and obtain biometric information.

In operation 1707, the electronic device 101 may identify a failure in authentication using biometric information while identifying that at least one of the position, shape, or size of the target object for recognition included in the obtained image meets a designated condition. For example, the electronic device 101 may identify that at least one of the position, shape, or size of the target object for recognition included in the image meets a designated condition to obtain biometric information. Although the condition is met, the electronic device 101 may identify that recognition according to biometric information obtained via the sensor fails.

In operation 1709, the electronic device 101 may identify that an accessory is worn based on image analysis. In operation 1711, the electronic device 101 may provide a conversion object along with information requesting to adjust the position of the accessory. For example, the electronic device 101 may identify that glasses are in the resultant image of image analysis. The electronic device 101 may identify various accessories from the image based on various recognition models. The electronic device 101 may identify that an accessory disturbing the sensing on the body part targeted for recognition or other objects (e.g., hair) are disposed in the image. The electronic device 101 may previously store a recognition model for accessories disturbing the sensing of the target body part for recognition or various objects. Such a recognition model may be generated by the electronic device 101 or received from another external electronic device. The recognition model may be updated by learning.

As shown in FIG. 18, the electronic device 101 may provide a conversion object along with information requesting to adjust the position of the accessory. For example, the electronic device 101 may display the text 1801 requesting to change the position of the accessory, "take off glasses."

Further, the electronic device 101 may switch a pre-accessory movement image, which is being displayed, into a post-accessory movement image. Accordingly, the user may identify that the position of the accessory needs to be changed. The pre-accessory movement image may include information for changing posture identified based on at least one of the position, shape, or size of the target object for recognition included in the obtained image, along with the conversion object 1802 and the object 1803 indicating the accessory. The post-accessory movement image may include information for changing posture identified based on at least one of the position, shape, or size of the target object for recognition included in the obtained image, along with the conversion object 1812 and the object 1813 indicating the accessory. The object 1813 indicating the accessory may be disposed away from the conversion object 1812 so that the user may recognize the need for taking off the accessory.

According to an embodiment, the electronic device 101 may provide at least one of a text or image that leads to the position where the accessory is to be moved based on the result of image analysis even without identifying failure based on sensing data via the sensor. According to an embodiment, the electronic device 101 may provide at least one of an image or text to request to reposition other various objects than glasses.

Figure 19:
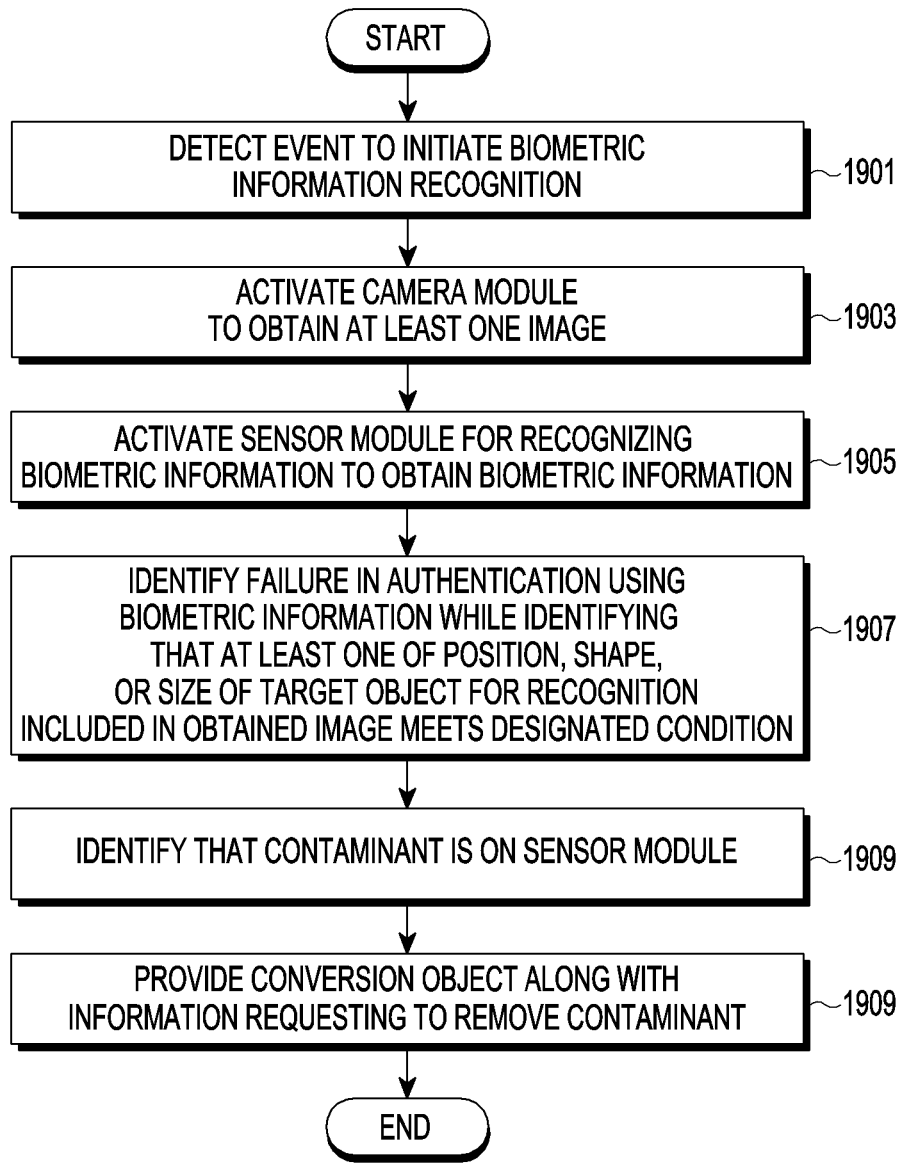
FIG. 19 is a flowchart illustrating an example method of operating an electronic device according to an embodiment.
Figure 20A:
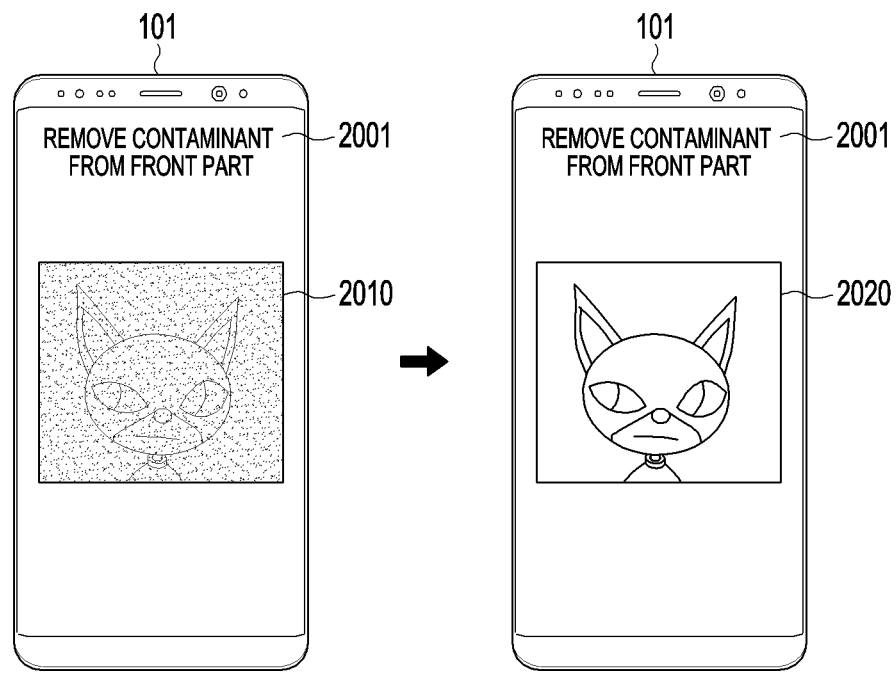
FIGS. 20A and 20B are diagrams illustrating an example electronic device according to an embodiment.
Figure 20B:
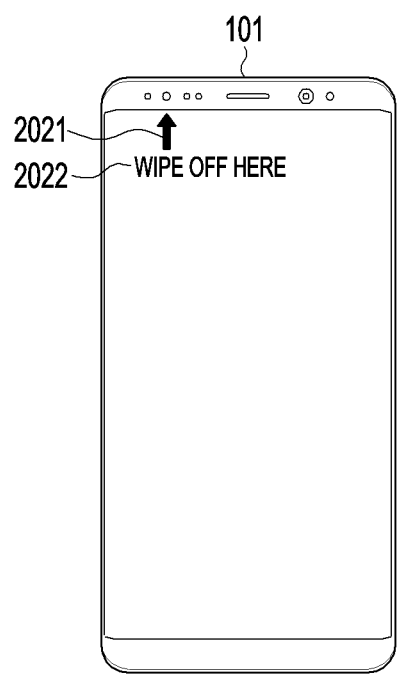

FIG. 19 is a flowchart illustrating an example method for operating an electronic device according to an embodiment of the disclosure. An example embodiment of FIG. 19 is described in greater detail with reference to FIGS. 20A and 20B. FIGS. 20A and 20B are diagrams illustrating an example electronic device according to an embodiment.

Referring to FIG. 19, the electronic device 101 may detect an event to initiate biometric information recognition in operation 1901. In operation 1903, the electronic device 101 may activate the camera module to obtain at least one image. In operation 1905, the electronic device 101 may activate the sensor module for recognizing biometric information and obtain biometric information.

In operation 1907, the electronic device 101 may identify a failure in authentication using biometric information while identifying that at least one of the position, shape, or size of the target object for recognition included in the obtained image meets a designated condition. Although the condition is met, the electronic device 101 may identify that recognition according to biometric information obtained via the sensor fails.

In operation 1909, the electronic device 101 may identify that a contaminant is on the sensor module. In operation 1911, the electronic device 101 may provide a conversion object along with information requesting to remove the contaminant.

The electronic device 101 may identify that the contaminant is on the sensor module (or glass on the sensor module) based on analysis of obtained biometric information. For example, the electronic device 101 may obtain an IR image via the IR sensor. The electronic device 101 may identify that a contaminant is on the IR sensor based on the result of IR image analysis. For example, the electronic device 101 may identify that the same object is in the same position in a plurality of IR images sequentially captured and may thus identify that the contaminant sticks in the position. The electronic device 101 may identify that a certain region is lower in resolution than another region and may thus identify that a contaminant is in the region. When the resolution of a captured IR image is lower than a designated value, the electronic device 101 may identify that a contaminant is present. The electronic device 101 may previously store a recognition model capable of recognizing contaminants and may identify the presence of a contaminant by identifying the result of application of the recognition model to the IR image. The above-described methods for identifying the presence of a contaminant amount to mere examples, and embodiments of the disclosure are not limited thereto.

For example, as shown in FIG. 20A, the electronic device 101 may display a text request to remove contaminants, e.g., "remove the contaminant from the front part." The electronic device 101 may switch an image 2010 indicating capturing under the presence of a contaminant, which is being displayed, into an image 2020 indicating capturing after the contaminant is removed. Accordingly, the user may identify the need for wiping off the front part of the sensor. The image 2010 indicating capturing under the presence of a contaminant and the image 2020 indicating capturing after the contaminant is removed may include a conversion object and information for changing posture identified based on at least one of the position, shape, or size of the target object for recognition included in the obtained image. Relatively, the image 2010 indicating capturing under the presence of a contaminant may be, e.g., a blurred image, and the image 2020 indicating capturing after the contaminant is removed may be a non-blurred image.

As shown in FIG. 20B, the electronic device 101 may display a text 2022 requesting to remove the contaminant along with an object 2021 indicating where a wipe-off is necessary. The object 2021 indicating where a wipe-off is necessary may differ depending on the position of the sensor.

Figure 21:
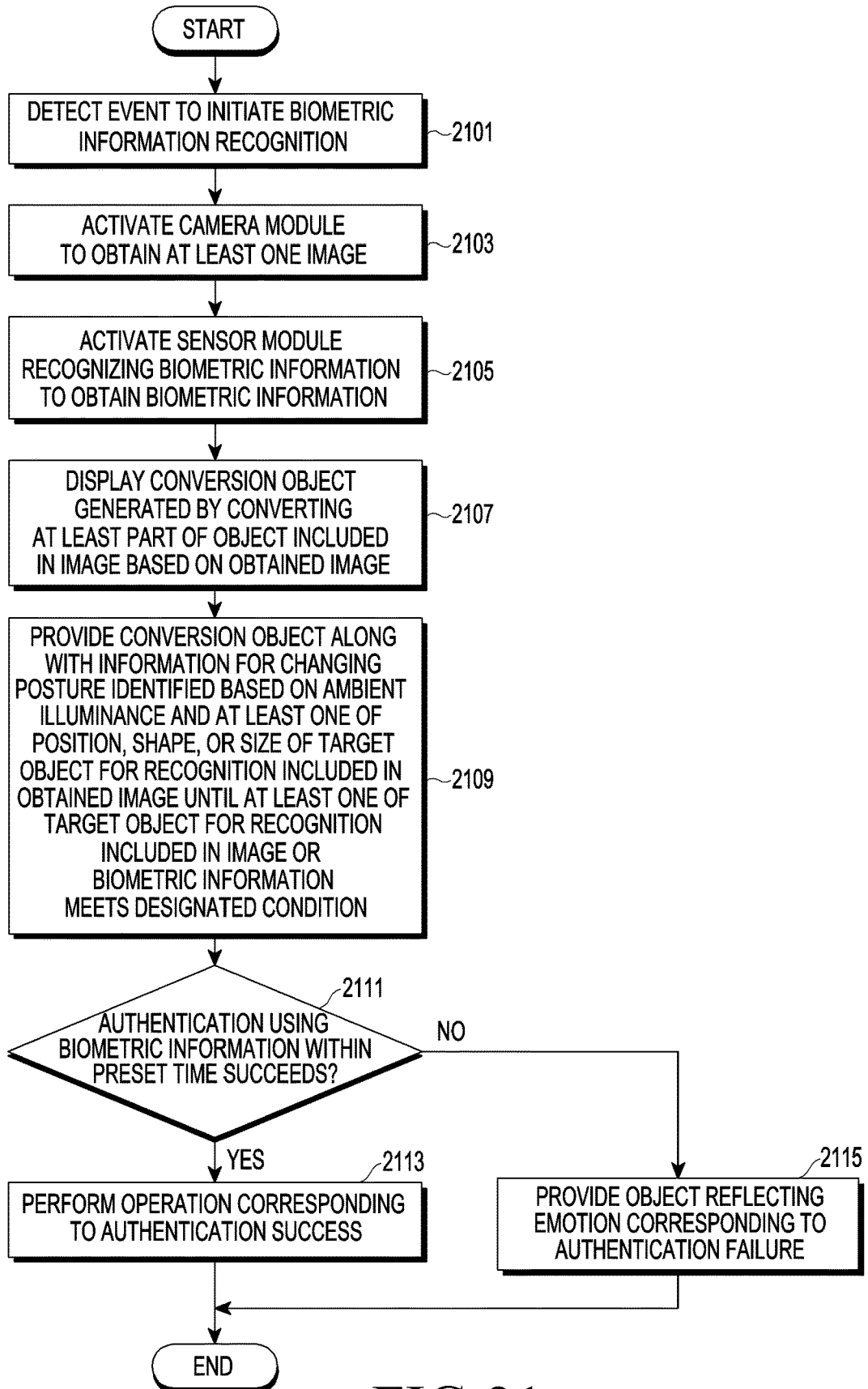
FIG. 21 is a flowchart illustrating an example method of operating an electronic device according to an embodiment.
Figure 22:
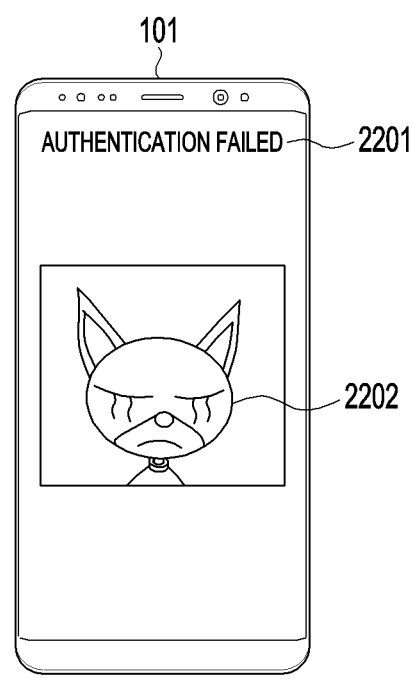
FIG. 22 is a diagram illustrating an example electronic device according to an embodiment.

FIG. 21 is a flowchart illustrating an example method for operating an electronic device according to an embodiment of the disclosure. An example embodiment related to FIG. 21 is described in greater detail with reference to FIG. 22. FIG. 22 is a diagram illustrating an example electronic device according to an embodiment.

Referring to FIG. 21, the electronic device 101 may detect an event to initiate biometric information recognition in operation 2101. In operation 2103, the electronic device 101 may activate the camera module to obtain at least one image. In operation 2105, the electronic device 101 may activate the sensor module for recognizing biometric information and obtain biometric information. In operation 2107, the electronic device 101 may display a conversion object which is generated by converting at least part of an object contained in the image based on the obtained image. In operation 2109, the electronic device 101 may provide the conversion object along with information for changing posture, which is identified based on the ambient illuminance and at least one of the position, shape, or size of the target object for recognition included in the obtained image until at least one of the biometric information or the target object for recognition included in the image meets a designated condition.

In operation 2111, the electronic device 101 may identify whether authentication using biometric information succeeds within a preset time. When authentication is identified to succeed ("Yes" in operation 2111), the electronic device 101 may perform an operation corresponding to the success in authentication in operation 2113. For example, the electronic device 101 may release the lock state of the electronic device 101 and display a menu screen. The electronic device 101 may perform, e.g., a login to a particular homepage or electronic payment. When authentication is identified to fail ("No" in operation 2111), the electronic device 101 may provide an emoji corresponding to authentication failure in operation 2115. For example, the electronic device 101 may display an object 2202 reflecting an emotion corresponding to authentication failure as shown in FIG. 22. The electronic device 101 may also display a text 2201 indicating authentication failure. The electronic device 101 may store objects corresponding to various emotions. The electronic device 101 may display an object expressing sadness which corresponds to authentication failure.

According to an embodiment, the electronic device 101 may set and display the background, e.g., the remaining region except for the object 2202, of the screen of the electronic device 101 in a different color than before.

According to an embodiment, when authentication is identified to succeed, the electronic device 101 may provide an object reflecting an emotion corresponding to authentication success and then perform an operation corresponding to authentication success. For example, the electronic device 101 may display an object expressing happiness which corresponds to authentication success. The electronic device 101 may change the color of the background into a color corresponding to authentication success and display the color-changed background.

According to an embodiment, the electronic device 101 may display an object reflecting a different emotion or display the background in a different color for each authentication attempt. The electronic device 101 may display an object reflecting a different emotion or display the background in a different color for each authentication step.

Figure 23:
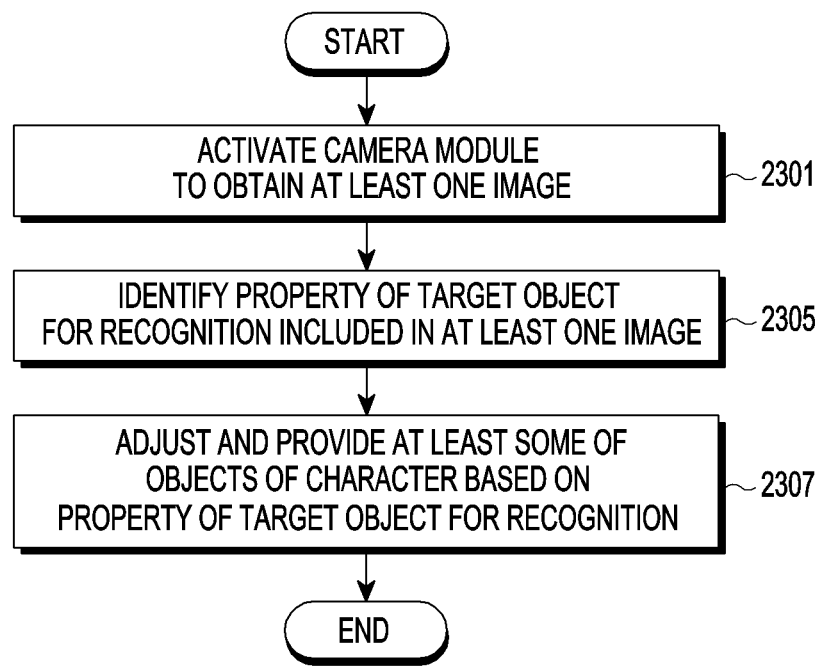
FIG. 23 is a flowchart illustrating an example method of operating an electronic device according to an embodiment.
Figure 24A:
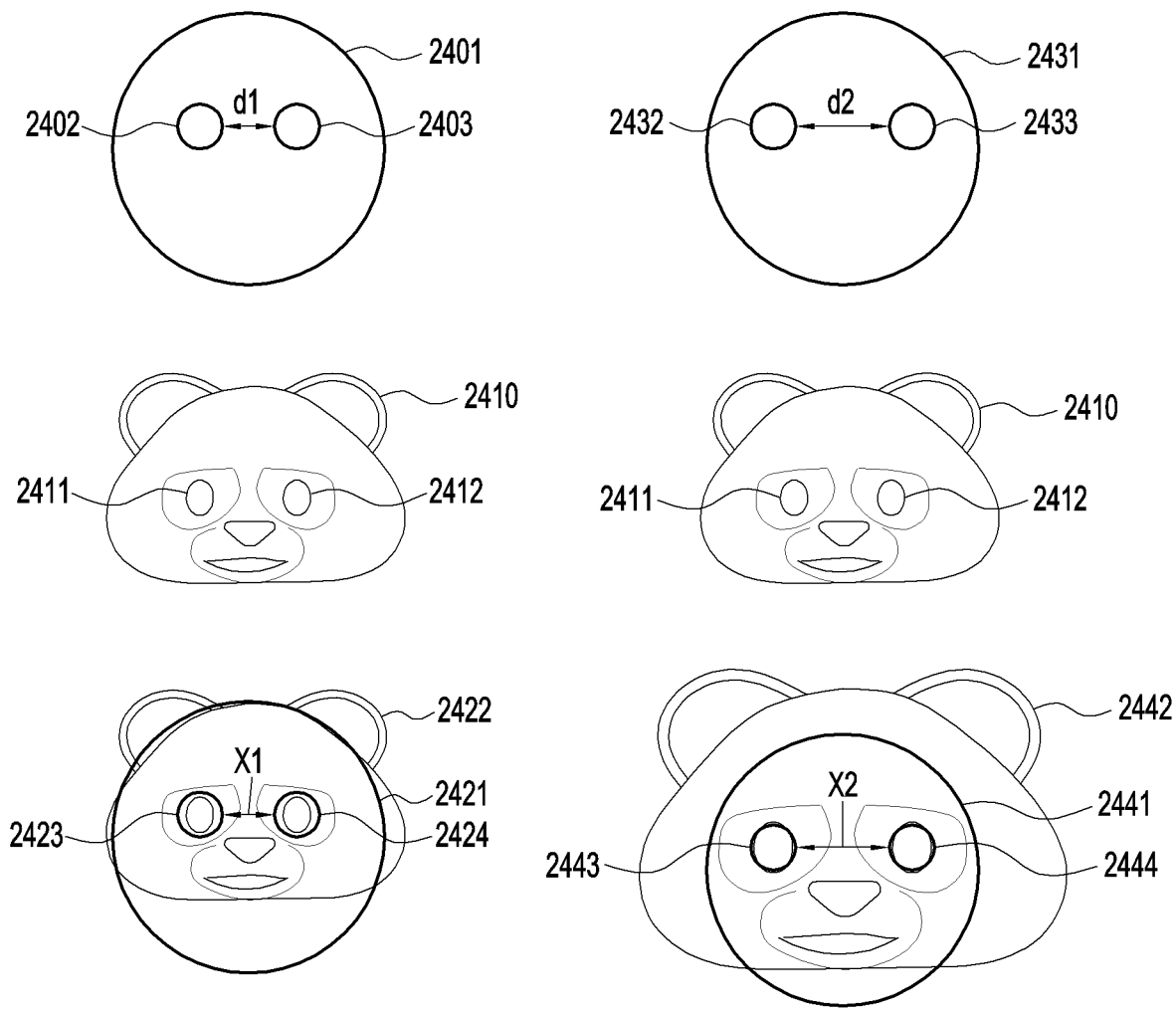
FIGS. 24A and 24B are diagrams illustrating example objects according to an embodiment.
Figure 24B:
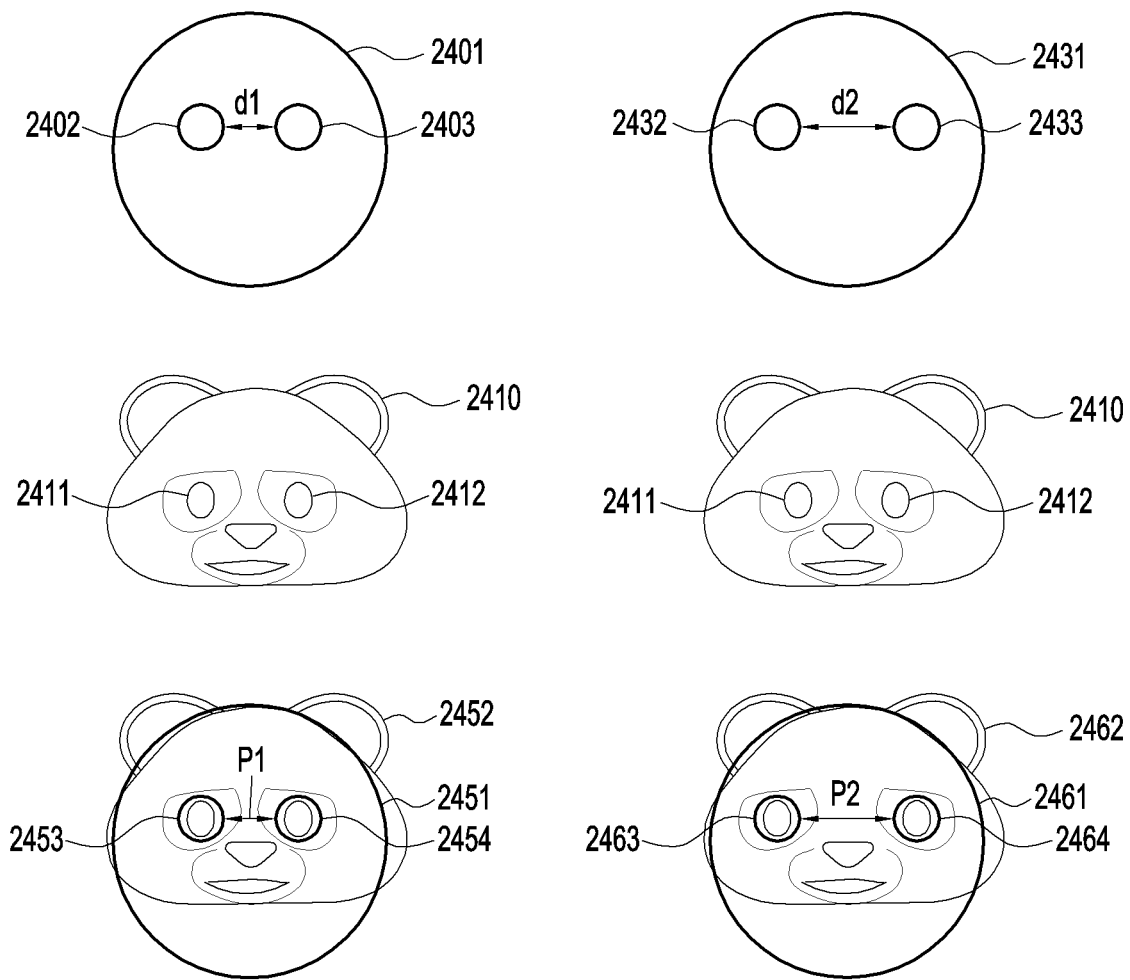

FIG. 23 is a flowchart illustrating an example method for operating an electronic device according to an embodiment of the disclosure. An example embodiment of FIG. 23 is described in greater detail with reference to FIGS. 24A and 24B. FIGS. 24A and 24B are diagrams illustrating example objects according to an embodiment.

In operation 2301, the electronic device 101 may activate the camera module to obtain at least one image. In operation 2303, the electronic device 101 may identify the properties of a target object for recognition included in at least one image. For example, when the electronic device 101 performs iris recognition-based authentication, the electronic device 101 may identify a region corresponding to an iris from each of the at least one image. The electronic device 101 may identify the properties of a target object for recognition including at least one of the position, shape, or size of the iris region. When there are a plurality of target objects for recognition (e.g., two irises), the electronic device 101 may identify a relative position between the iris regions (e.g., the distance between the iris regions) as a property of the target object for recognition.

In operation 2305, the electronic device 101 may adjust at least some of the objects of the character based on the properties of the target object for recognition and provide the same. The electronic device 101 may display the object of the character, which corresponds to the target object for recognition, based on the identified property of the target object for recognition.

For example, referring to FIG. 24A, the electronic device 101 may identify a face region 2401 of a first user from a first image captured of the first user and identify iris regions 2402 and 2403 included in the face region 2401. That the electronic device 101 identifies the face region and detects the iris regions from the identified face region amounts to a mere example. The electronic device 101 may identify the iris regions immediately without identifying the face region. The electronic device 101 may identify that the distance between the iris regions 2402 and 2403 of the first user is d1. The electronic device 101 may store a template image 2410 set to be displayed during an authentication process. The template image 2410 may include objects 2411 and 2412 corresponding to, e.g., the irises. The template image 2410 may be set to be uneditable in detail and, thus, the objects 2411 and 2412 may not individually be edited. In this case, the electronic device 101 may reflect the properties of the iris regions to the displayed objects by adjusting the size of the template image 2410. For example, the electronic device 101 may identify a first size which corresponds to the inter-iris distance d1 and display an object 2422, which results from setting the template image 2410 to the first size, on the screen. The distance X1 between the objects corresponding to the irises included in the object 2422 set to the first size may be disposed in authentication regions 2423 and 2424 within the region 2421 corresponding to the face. The electronic device 101 may store the relationship between d1, which is the inter-iris distance identified in the image, and the first size or the distance X1 between the authentication regions 2423 and 2424. The electronic device 101 may also set the distance X1 between the authentication regions 2423 and 2424 corresponding to the inter-iris distance d1. The electronic device 101 may perform iris recognition on the positions corresponding to the authentication regions 2423 and 2424 even in the IR image for iris recognition.

Meanwhile, the electronic device 101 may identify a face region 2431 of a second user from a second image captured of the second user and identify iris regions 2432 and 2433 included in the face region 2431. The electronic device 101 may identify that the distance between the iris regions 2432 and 2433 of the second user is d2. For example, the electronic device 101 may identify a second size which corresponds to the inter-iris distance d2 and display an object 2442, which results from setting the template image 2410 to the second size, on the screen. The distance X2 between the objects 2443 and 2444 corresponding to the irises included in the object 2442 set to the second size may be disposed in authentication regions 2443 and 2444 within the region 2441 corresponding to the face. The electronic device 101 may store the relationship between d2, which is the inter-iris distance identified in the image, and the second size or the distance X2 between the authentication regions 2443 and 2444. The electronic device 101 may also set the distance X2 between the authentication regions 2443 and 2444 corresponding to the inter-iris distance d2. The electronic device 101 may perform iris recognition on the positions corresponding to the authentication regions 2443 and 2444 even in the IR image for iris recognition.

Although not shown, the electronic device 101 may set the size of displayed objects based on the size or shape of an iris. For the emoji mimicking the user's face, the electronic device 101 may also set the overall size of the emoji to reflect the properties of the target object for recognition.

FIG. 24B is a diagram illustrating an example in which detailed editing is possible on objects 2411 and 2412 in a template 2410. The electronic device 101 may adjust the properties of, and display, objects corresponding to the irises based on the identified properties of a target object for recognition.

For example, the electronic device 101 may identify that the distance between the iris regions 2402 and 2403 of the first user is d1. For example, corresponding to the inter-iris distance d1, the electronic device 101 may adjust the distance between the objects 2411 and 2412 corresponding to the irises in the template 2410. Thus, the electronic device 101 may generate and display an object 2452 in which the distance between the objects corresponding to the irises is P1. The electronic device 101 may store the correspondence between the distance d1 between the objects 2411 and 2412 corresponding to the irises and the distance P1 between the objects corresponding to the irises and, based on the correspondence, adjust the properties of the objects corresponding to the irises in the object 2452. The electronic device 101 may set the target objects 2453 and 2454 for recognition, corresponding to the face region 2451, to P1 as well. The electronic device 101 may also perform iris recognition on the positions corresponding to the target objects 2543 and 2454 for recognition in the IR image.

For example, the electronic device 101 may identify that the distance between the iris regions 2432 and 2433 of the second user is d2. For example, corresponding to the inter-iris distance d2, the electronic device 101 may adjust the distance between the objects 2411 and 2412 corresponding to the irises in the template 2410. Thus, the electronic device

101 may generate and display an object 2462 in which the distance between the objects corresponding to the irises is P2. The electronic device 101 may store the correspondence between the distance d1 between the objects 2411 and 2412 corresponding to the irises and the distance P2 between the objects corresponding to the irises and, based on the correspondence, adjust the properties of the objects corresponding to the irises in the object 2462. The electronic device 101 may set the target objects 2463 and 2464 for recognition, corresponding to the face region 2461, to P2 as well. The electronic device 101 may also perform iris recognition on the positions corresponding to the target objects 2463 and 2464 for recognition in the IR image.

Figure 25:
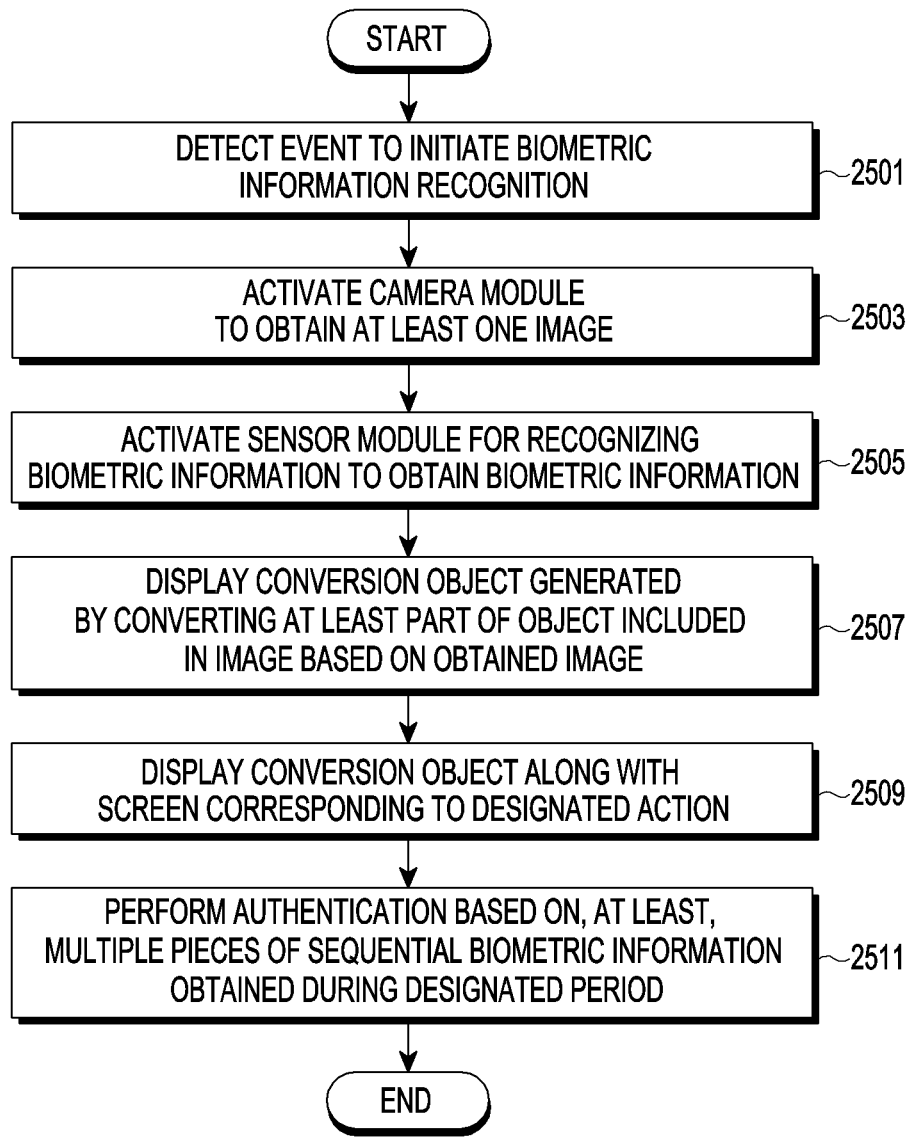
FIG. 25 is a flowchart illustrating an example method of operating an electronic device according to an embodiment.
Figure 26:
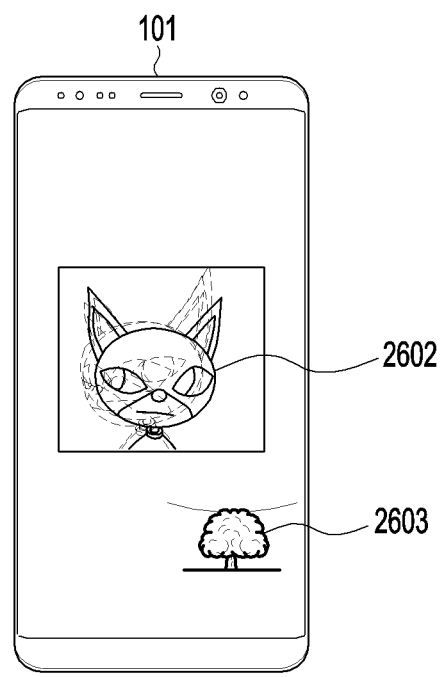
FIG. 26 is a diagram illustrating an example electronic device according to an embodiment.

FIG. 25 is a flowchart illustrating an example method for operating an electronic device according to an embodiment of the disclosure. The example embodiment shown in FIG. 25 is described in further detail with reference to FIG. 26. FIG. 26 is a diagram illustrating an electronic device according to various embodiments of the disclosure.

Referring to FIG. 25, the electronic device 101 may detect an event to initiate biometric information recognition in operation 2501. In operation 2503, the electronic device 101 may activate the camera module to obtain at least one image. In operation 2505, the electronic device 101 may activate the sensor module for recognizing biometric information and obtain biometric information. In operation 2507, the electronic device 101 may display a conversion object which is generated by converting at least part of an object contained in the image based on the obtained image.

In operation 2509, the electronic device 101 may display a screen corresponding to a designated action, along with the conversion object. For example, the electronic device 101 may perform multi-factor authentication. The electronic device 101 may perform multi-factor authentication by identifying biometric information and operation information. The electronic device 101 may identify whether biometric information corresponds to pre-stored information and may perform multi-factor authentication based on whether the user's action corresponds to a predesignated action. For example, the electronic device 101 may store the user's face turning as the designated action and store information obtained from an IR image for the face as biometric authentication information. The electronic device 101 may display an animation 2602 corresponding to the designated action. For example, the electronic device 101 may display an animation 2602 in which a character which is staring ahead turns its face to the right. The electronic device 101 may further display an image 2603 (or animation) to lead the user to turn the user's face to the right in the background. Accordingly, the user may perform an action led by the image 2603.

In operation 2511, the electronic device 101 may perform authentication based on, at least, a plurality of pieces of sequential biometric information obtained during a designated period. For example, the electronic device 101 may obtain a plurality of pieces of sequential IR images via the IR camera. The electronic device 101 may extract, e.g., a feature point from at least one of the plurality of IR images and identify whether information about the feature point corresponds to pre-stored feature point information. The electronic device 101 may identify whether first authentication succeeds based on whether they correspond to each other. The electronic device 101 may analyze the plurality of IR images and identify the user's action. For example, the electronic device 101 may analyze the IR images to identify that the user's face is directed ahead and then turns right. The electronic device 101 may identify whether second authentication succeeds based on whether the identified action corresponds to a pre-stored action. Upon identifying that the first authentication and the second authentication both succeed, the electronic device 101 may identify that authentication succeeds. According to an embodiment, the electronic device 101 may be configured to perform the first authentication based on biometric information obtained via the sensor module and the action-based second authentication based on an image obtained via the camera. The above-described face recognition is merely an example and it would readily be appreciated by one of ordinary skill in the art that various pieces of biometric information may be used for one among multi-factor authentication schemes.

Figure 27:
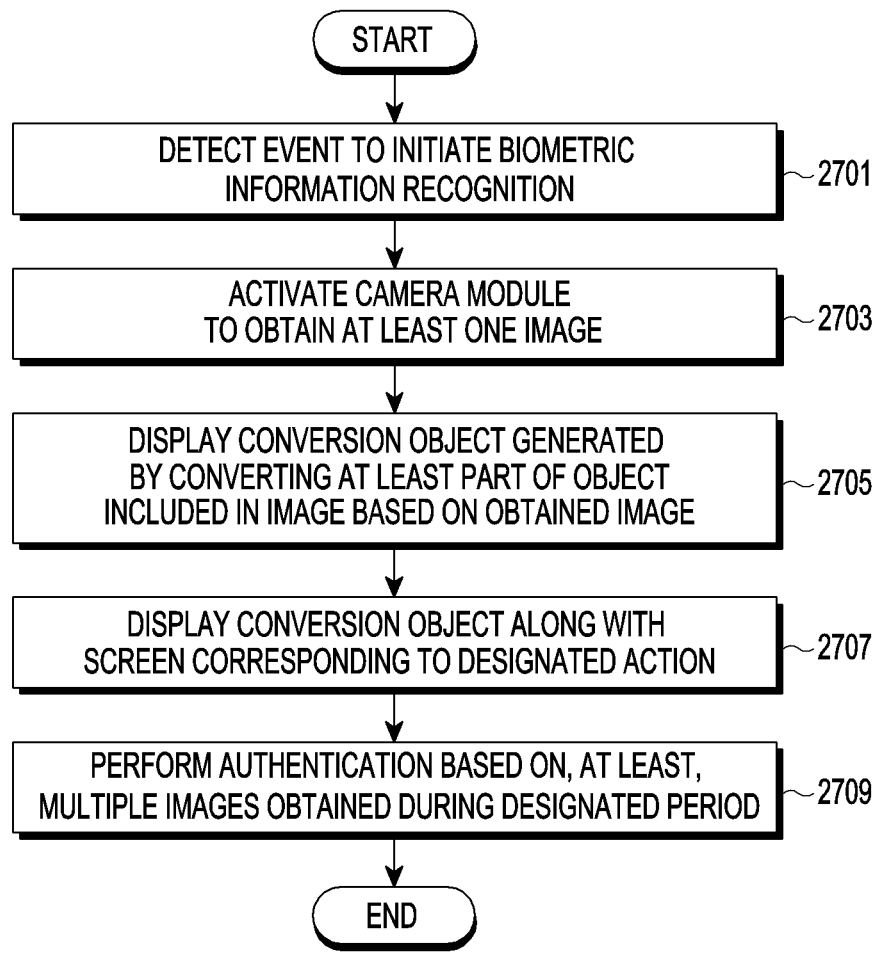
FIG. 27 is a flowchart illustrating an example method of operating an electronic device according to an embodiment.

FIG. 27 is a flowchart illustrating an example method for operating an electronic device according to an embodiment of the disclosure.

The electronic device 101 may detect an event to initiate biometric information recognition in operation 2701. In operation 2703, the electronic device 101 may activate the camera module to obtain at least one image. In operation 2705, the electronic device 101 may display a conversion object which is generated by converting at least part of an object contained in the image based on the obtained image. According to an embodiment, the electronic device 101 may refrain from activating the sensor module.

In operation 2709, the electronic device 101 may display a screen corresponding to a designated action, along with the conversion object. For example, as shown in FIG. 26, the electronic device 101 may display at least one of an animation 2602 corresponding to the designated action or an image 2603 to lead to the designated action.

In operation 2711, the electronic device 101 may perform authentication based on, at least, a plurality of images obtained during a designated period. In this case, the electronic device 101 may perform authentication based on whether a detected action corresponds to a stored action. The electronic device 101 may perform authentication based on a result of recognizing at least one object in the image in addition to whether the actions correspond to each other. For example, the electronic device 101 may identify a face region from the image and recognize the face region. The electronic device 101 may perform authentication based on whether the result of recognizing the face region corresponds to designated information. In other words, as set forth above, the electronic device 101 may perform multi-factor authentication based on information obtained from the image even without using data from the sensor module.

Various example embodiments as set forth herein may be implemented as software (e.g., the program) containing commands that are stored in a machine (e.g., computer)-readable storage medium (e.g., an internal memory), an external memory, or the like, but the disclosure is not limited thereto. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated by a compiler or a code that is executed by an interpreter. The machine-readable storage medium may be provided in the form of a non-transitory storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Play-store™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. Operations performed by modules, programs or other components in accordance with various embodiments of the disclosure may be carried out sequentially, in parallel, repeatedly or heuristically, or at least some operations may be executed in a different order or omitted or other operations may be added.

As is apparent from the foregoing description, according to various embodiments, there may be provided an electronic device capable of converting an image captured of the user into an object and displaying the object and a method of operating the same. Thus, it may be possible to prevent and/or reduce leakage of biometric information, such as iris information or face information. Also possible is to meet the user's desire to prevent the user's specific body part from being exposed in a public place.

While the disclosure has been illustrated and described with reference to various example embodiments thereof, it will be understood by those skilled in the art that various changes in form and details may be made therein without departing from the spirit and scope of the disclosure as defined, for example, by the appended claims and their equivalents.

What is claimed is:

1. An electronic device, comprising:
a camera module including a camera;
a sensor module including a sensor;
a display;
a memory configured to store registered biometric information; and
a processor configured to:
obtain at least one image using the camera module,
obtain biometric information using the sensor module,
control the display to display a first object generated by converting at least part of a second object included in the at least one image, and
control the display to display the first object together with information for changing posture identified based on a position, shape, and size of eyes of the second object included in the at least one image until the obtained biometric information and the registered biometric information meet a designated condition,
wherein the processor is configured to, before the designated condition is met, animate the first object to change posture of the first object from a current posture corresponding to a current posture of the second object to a designated posture for obtaining the biometric information according to the information for changing posture, and
wherein the processor is further configured to:
determine the current posture of the second object included in the at least one image based on the position, shape and size of the eyes of the second object and a first distance between irises of the second object in the at least one image; and
adjust a second distance between irises of the first object based on at least the first distance while maintaining a size of the first object,
wherein animating the first object to change the posture of the first object from the current posture of the first object to the designated posture includes changing a position, shape and orientation of the first object based on the position, the shape and the size of the eyes of the second object and the first distance between irises of the second object.

2. The electronic device of claim 1, wherein the processor is configured to:
control the sensor module to radiate an infrared (IR) ray and receive a reflection of the IR ray,
identify an IR image for an eye based on the reflection,
identify iris information from the IR image, and
control the display to display the information for changing posture until the identified iris information corresponds to iris information stored in the memory.

3. The electronic device of claim 1, wherein the processor is configured to:
control the sensor module to radiate an infrared (IR) ray and receive a reflection of the IR ray,
identify an IR image for a face based on the reflection,
identify face information from the IR image, and
control the display to display the information for changing posture until the identified face information corresponds to face information stored in the memory.

4. The electronic device of claim 1, wherein the processor is configured to:
control the display to display the information for changing posture identified based on a difference between the position of the eyes of the second object and a reference position, a difference between the shape of the eyes of the second object and a reference shape, and a difference between the size of the eyes of the second object and a reference size.

5. The electronic device of claim 4, wherein the processor is configured to:
control the display to the display at least one of a text or an image corresponding to the difference between the position of the eyes of the second object and the reference position, the difference between the shape of the eyes of the second object and the reference shape, and the difference between the size of the eyes of the second object and the reference size.

6. The electronic device of claim 4, wherein the processor is configured to:
control the display to display the first object together with a guide based on at least one of the reference shape or the reference size in a position corresponding to the reference position.

7. The electronic device of claim 1,
wherein animating the first object to change the posture of the first object includes turning the first object.

8. The electronic device of claim 1, wherein the processor is configured to: generate the first object using a texture corresponding to the part of the second object included in the at least one image, or generate the first object using a texture stored in the memory.

9. The electronic device of claim 1, wherein the processor is configured to:
control the display to display first information for changing posture together with a first conversion object obtained by converting at least part of an object included in a first image of the at least one image based on identifying that a first target object for recognition included in the first image meets a first condition and,
control the display to display second information for changing posture, the second information for changing posture being different from the first information for changing posture, together with a second conversion object obtained by converting at least part of an object included in a second image of the at least one image, obtained after the first image, based on identifying that a second target object for recognition included in the second image meets a second condition.

10. The electronic device of claim 1, wherein the processor is configured to:
identify information about an ambient illuminance of the electronic device and provide the first object together with information for changing an illuminance environment based on the information about the ambient illuminance.

11. The electronic device of claim 1, wherein the processor is configured to:
identify a presence of an object disturbing detection of the eyes of the second object based on a result of analyzing the at least one image and provide the first object together with information requesting to change a position of the object disturbing detection of the eyes of the second object.

12. The electronic device of claim 1, wherein the processor is configured to:
identify a contaminant present on the sensor module, and provide the first object together with information for requesting removal of the contaminant.

13. The electronic device of claim 1, wherein the processor is configured to:
identify an authentication failure based on the obtained biometric information and the registered biometric information not meeting the designated condition within a preset time, and
control the display to display an object reflecting an emotion corresponding to the authentication failure.

14. The electronic device of claim 1, wherein the processor is configured to:
control the memory to store a template image,
identify a size of the template image based on the position, shape, and size of the eyes of the second object included in the at least one image, and
control the display to display the template image of the identified size as the first object.

15. The electronic device of claim 1, wherein the processor is configured to:
control the memory to store a template image,
adjust at least one of a position, shape, or size of a sub object in the template image based on at least one of the position, shape, or size of the eyes of the second object included in the at least one image, and
control the display to display the adjusted template image as the first object.

16. The electronic device of claim 1, wherein the processor is configured to:
control the memory to store information about a designated action,
identify information about an action based on the at least one image, and
identify that authentication succeeds based on the obtained biometric information and the registered biometric information meeting the designated condition and the identified information about the action corresponding to the information about the designated action.

17. The electronic device of claim 1, wherein the processor is configured to:
control the memory to store information about a designated action,
identify information about an action based on data from the sensor module, and,
identify that authentication succeeds based on the obtained biometric information and the registered biometric information meeting the designated condition and the identified information about the action corresponding to the information about the designated action.

18. A method of operating an electronic device, the electronic device including a camera module, a sensor module, and a display, the method comprising:
obtaining at least one image using the camera module;
obtaining biometric information using the sensor module;
displaying, via the display, a first object generated by converting at least part of a second object included in the at least one image; and
displaying, via the display, the first object together with information for changing posture identified based on a position, shape, and size of eyes of the second object included in the at least one image until the obtained biometric information and stored registered biometric information meet a designated condition,
wherein, before the designated condition is met, the first object is animated to change posture of the first object from a current posture corresponding to a current posture of the second object to a designated posture for obtaining the biometric information according to the information for changing posture,
wherein the method further comprises:
determining the current posture of the second object included in the at least one image based on the position, shape and size of eyes of the second object and a first distance between irises of the second object in the at least one image; and
adjusting a second distance between irises of the first object according to the first distance while maintaining a size of the first object,
wherein animating the first object to change the posture of the first object from the current posture of the first object to the designated posture includes changing a position, shape and orientation of the first object based on the position, the shape and the size of the eyes of the second object and the first distance between irises of the second object.

19. The method of claim 18, further comprising:
controlling the sensor module to radiate an IR ray and receive a reflection of the IR ray,
identifying an IR image for a user's eye based on the reflection;
identifying second iris information from the IR image; and
displaying, on the display, the information for changing posture until the identified iris information corresponds to first iris information.

20. The method of claim 18, further comprising:
controlling the sensor module to radiate an IR ray and receive a reflection of the IR ray,
identifying an IR image for a user's face based on the reflection;
identifying face information from the IR image; and
displaying, on the display, the information for changing posture until the identified face information corresponds to face information stored in a memory.

21. The method of claim 18, further comprising:
displaying, via the display, the information for changing posture identified based on at least one of a difference between the position of a target object for recognition and a reference position, a difference between the shape of the target object for recognition and a reference shape, or a difference between the size of the target object for recognition and a reference size.

22. The method of claim 21, further comprising:
displaying, via the display, at least one of a text or an image corresponding to the difference between the position of the eyes of the second object and the reference position, the difference between the shape of the eyes of the second object and the reference shape, and the difference between the size of the target object for recognition and the reference size.

23. The method of claim 21, further comprising:
displaying the first object together with a guide based on at least one of the reference shape or the reference size in a position corresponding to the reference position.

24. The method of claim 18,
wherein animating the first object to change the posture of the first object includes turning the first object.

25. The method of claim 18, further comprising:
generating the first object using a texture corresponding to the part of the second object included in the at least one image or generating the conversion object using a texture stored in a memory.

26. The method of claim 18, further comprising:
displaying, via the display, first information for changing posture together with a first conversion object obtained by converting at least part of an object included in a first image of the at least one image based on identifying that a first target object for recognition included in the first image meets a first condition and,
displaying, via the display, second information for changing posture, second information for changing posture different from the first information for changing posture, together with a second conversion object obtained by converting at least part of an object included in a second image of the at least one image obtained after the first image based on identifying that a second target object for recognition included in the second image meets a second condition.

27. An electronic device, comprising:
a camera module including a camera;
a sensor module including sensing circuitry;
a display;
a memory; and
a processor configured to:
control the memory to store registered biometric information,
obtain at least one image using the camera module,
obtain biometric information using the sensor module,
control the display to display a first object generated by converting at least part of a second object included in the at least one image,
control the display to display the first object together with a guide indicating a region for obtaining the biometric information, and
identify that authentication succeeds based on identifying that the obtained biometric information and the registered biometric information meet a designated condition,
wherein, before the designated condition is met, the first object is animated from a current posture corresponding to a current posture of the second object to a designated posture for indicating the region for obtaining the biometric information, and
wherein the processor is further configured to:
determine the current posture of the second object included in the at least one image based on position, shape and size of eyes of the second object and a first distance between irises of the second object in the at least one image; and
adjust a second distance between irises of the first object based on the first distance while maintaining a size of the first object,
wherein animating the first object to change the posture of the first object from the current posture of the first object to the designated posture includes changing a position, shape and orientation of the first object based on the position, the shape and the size of the eyes of the second object and the first distance between irises of the second object.

28. The electronic device of claim 27,
wherein animating the first object includes turning the first object.

* * * * *